(12) United States Patent
Cui et al.

(10) Patent No.: US 11,693,153 B2
(45) Date of Patent: Jul. 4, 2023

(54) OMNIDIRECTIONAL AND THERMALLY DURABLE INFRARED REFLECTORS, AND METHODS FOR MAKING THE SAME

(71) Applicant: HRL Laboratories, LLC, Malibu, CA (US)

(72) Inventors: Shanying Cui, Calabasas, CA (US); Sean M. Meenehan, Sherman Oaks, CA (US); Tobias A. Schaedler, Oak Park, CA (US); Phuong Bui, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 339 days.

(21) Appl. No.: 16/990,096

(22) Filed: Aug. 11, 2020

(65) Prior Publication Data
US 2021/0157031 A1  May 27, 2021

Related U.S. Application Data

(60) Provisional application No. 62/940,294, filed on Nov. 26, 2019.

(51) Int. Cl.
*G02B 1/00* (2006.01)
*G02B 5/10* (2006.01)

(52) U.S. Cl.
CPC ............... *G02B 1/005* (2013.01); *G02B 5/10* (2013.01)

(58) Field of Classification Search
CPC ...... G02B 6/1225; G02B 1/005; G02B 5/008; G02B 1/002; G02B 1/007; G02B 26/06; G02F 1/292; G02F 2202/30
See application file for complete search history.

(56) References Cited

U.S. PATENT DOCUMENTS 5,406,573 A    4/1995  Ozbay et al.
6,392,787 B1   5/2002  Cirelli et al.
(Continued)

OTHER PUBLICATIONS

Xu et al., "Template Synthesis of 3D High-Temperature Silicon-Oxycarbide and Silicon-Carbide Ceramic Photonic Crystals from Interference Lithographically Patterned Organosilicates", Chem. Mater. 2010, 22, 5957-5963.
(Continued)

*Primary Examiner* — Jonathan Y Jung
(74) *Attorney, Agent, or Firm* — O'Connor & Company; Ryan P. O'Connor

(57) ABSTRACT

The disclosed structure is configured such that it does not support electromagnetic waves having frequencies within a selected band gap; those electromagnetic waves are thus reflected. Some variations provide an omnidirectional infrared reflector comprising a three-dimensional photonic crystal containing: rods of a first material that has a first refractive index, wherein the rods are arranged to form a plurality of lattice periods in three dimensions, and wherein the rods are connected at a plurality of nodes; and a second material that has a refractive index that is lower than the first refractive index, wherein the rods are embedded in the second material. The lattice spacing and the rod radius or width are selected to produce a photonic band gap within a selected band of the infrared spectrum. Methods of making and using the three-dimensional photonic crystal are described. Applications include thermal barrier coatings and blackbody emission signature control.

20 Claims, 10 Drawing Sheets

(56) References Cited

U.S. PATENT DOCUMENTS

| | | | |
|---|---|---|---|
| 7,018,467 B2 | 3/2006 | Geusic et al. | |
| 10,399,909 B1 | 9/2019 | Eckel et al. | |
| 2004/0214361 A1* | 10/2004 | Murakowski | G02B 6/1225 |
| | | | 438/31 |
| 2006/0029349 A1* | 2/2006 | Hoshi | G02B 6/1225 |
| | | | 385/129 |
| 2006/0137601 A1 | 6/2006 | Miguez et al. | |
| 2007/0031108 A1* | 2/2007 | Sugita | G02B 6/1225 |
| | | | 385/147 |
| 2011/0151673 A1* | 6/2011 | Noda | H01L 21/3065 |
| | | | 438/712 |
| 2017/0052292 A1* | 2/2017 | Wilson | G02B 5/208 |
| 2019/0016892 A1* | 1/2019 | Garcia | C08L 83/16 |

OTHER PUBLICATIONS

Men et al., "Robust topology optimization of three-dimensional photonic-crystal band-gap structures", Optics Express, Sep. 22, 2014, vol. 22, No. 19, 22633-22648.

Kalra et al., "Modelling and design of complete photonic band gaps in two-dimensional photonic crystals", PRAMANA Journal of Physics, vol. 70, No. 1, 2008, 153-161.

Marichy et al., "High-quality photonic crystals with a nearly complete band gap obtained by direct inversion of woodpile templates with titanium dioxide", Scientific Reports | 6:21818 | DOI: 10.1038/srep21818.

Subramania et al., "Gallium Nitride Based Logpile Photonic Crystals", Nano Lett. 2011, 11, 4591-4596.

International Search Report and Written Opinion, PCT/US2020/045834, dated Nov. 16, 2020.

* cited by examiner

OMNIDIRECTIONAL AND THERMALLY DURABLE INFRARED REFLECTORS, AND METHODS FOR MAKING THE SAME

PRIORITY DATA

This patent application is a non-provisional application with priority to U.S. Provisional Patent App. No. 62/940,294, filed on Nov. 26, 2019, which is hereby incorporated by reference herein.

FIELD OF THE INVENTION

The present invention generally relates to structures that can reflect infrared light from all incident directions.

BACKGROUND OF THE INVENTION

A photonic crystal contains a periodic lattice of contrasting dielectric structures (i.e., different indices of refraction). Light interacting with the periodic lattice is redistributed into allowed directions and is precluded from forbidden directions. The forbidden directions are the "photonic band gaps" of the photonic crystal. Photonic crystals can be designed with photonic band gaps that prevent light of a certain wavelength and direction from propagating within the photonic crystal. Photonic crystals utilize sub-wavelength structures to create photonic band gaps. Light having frequencies within the band gap cannot be supported by the structure, and when incident upon the material, that light is reflected away.

Much research has been devoted to the fabrication and study of photonic crystals in the infrared and visible spectrums. In a one-dimensional (1D) photonic crystal, layers of different dielectric constant may be deposited or adhered together to form a band gap in a single direction. The state-of-the-art reflectors are made of Bragg stacks with varying refractive index and tuned thicknesses in one dimension. Bragg reflectors reflect infrared light most efficiently at normal incidence and less effectively with higher incidence angles. 1D photonic crystals cannot have a complete band gap.

Two-dimensional (2D) photonic crystals have periodicity in two dimensions and are uniform in the third dimension. 2D photonic crystals are generally easier to fabricate than 3D photonic crystals. For example, holes may be drilled in a substrate that is transparent to the wavelength of radiation that the band gap is designed to block, in two dimensions. 2D photonic crystals cannot have a complete band gap. While 2D photonic crystal waveguides are useful for certain applications such as planar circuits and distributed-feedback lasers, there are many applications that require 3D photonic crystals.

Three-dimensional (3D) photonic crystals have varying refractive index in three dimensions and hence are capable of being perfect reflectors regardless of incidence angles, providing a "complete photonic band gap" for the structure. Certain crystals lattices can form 3D photonic crystals having either a complete or incomplete band gap, depending on the lattice parameters. If the photonic crystal does not allow light to propagate within a wavelength range for all polarizations and directions (omnidirectional), the photonic crystal has a complete photonic band gap for that light wavelength range. Rather than being propagated, the light is reflected, regardless of angle of incidence. Many types of lattice unit cells exist. A diamond unit cell has desirable properties arising from the geometrical fact that the spatial period of the diamond lattice is nearly independent of spatial direction.

A necessary condition for a complete photonic band gap is that the contrasting dielectric lattice be periodic in all three dimensions. To date, however, forming 3D photonic crystals has proven difficult. This is particularly true where the desired band gap wavelength is in the infrared spectrum, since the dimensions of the lattice are generally smaller than the band gap wavelengths.

Fabricating 3D photonic crystals with pre-determined structures is daunting. Yablonovitch et al., "Photonic band structure: the face centered-cubic case employing non-spherical atoms," *Phys. Rev. Lett.* Vol. 67, No. 17, 2295-2298 (1991) describes the formation of an artificial 3D photonic crystal by tediously drilling an array of intersecting millimeter size holes in a dielectric material. This photonic crystal has a band gap in the microwave (not infrared) range of the spectrum and is of limited practical interest.

Some complex techniques have been developed for fabricating 3D photonic crystals, including forming individual dielectric layers, stacking and bonding the layers, and forming 3D waveguides to build the crystal. Other techniques involve self-assembled microspheres or materials deposited on a printed template, followed by depositing a high-refractive-index material on top of the structure. Diamond or diamond-like unit cells have been made using mechanically complicated crystal modifications requiring micro-drilling along six axes in the material, which is not practical.

There are many applications of 3D photonic crystals, including small optical and electro-optical integrated circuits and devices. IR reflectors that are traditionally configured in 1D or 2D may also benefit from 3D photonic crystals. IR mirrors are one example.

If a 3D photonic crystal is fabricated from a high-temperature ceramic material, the photonic crystal can withstand extreme thermal environments. There are several applications that require a reflector that is able to withstand high temperatures, operate within a broadband spectrum, and reflect light incident from all directions. Control of IR reflection or emission has applications in thermal management, blackbody emission signature control, and thermo-photovoltaics. Infrared optical reflectors are useful for reflecting heat for automotive vehicles and aircrafts.

Bragg reflectors, in addition to not being omnidirectional, are generally not durable at high temperatures. In a paper entitled "Temperature dependence of reflectivity of absorbing Bragg reflectors" by Shen et al., *Optics Express* vol. 287 (2001), the authors demonstrate a decrease in reflectivity in certain absorption bands with an increase in temperature. Moreover, most dielectric materials used for Bragg stacks cannot survive temperatures above 1000° C. Finally, Bragg stacks exhibit sensitivity to angle of incidence. At high angles, the bandwidth of the reflected light decreases, and the wavelengths also change. These characteristics are problematic for a reflector inside an engine that is at exposed to high temperatures and must reflect radiative light from all angles.

Omnidirectional reflectivity combined with temperature stability is needed for applications such as thermal barrier coatings. Jet propulsion engine efficiency decreases as heat is lost through the walls. Thermal barrier coatings are used to insulate the heat in the engine from highly thermally conductive metal walls that will move heat away. However, gases in the combustion chamber emit 0.1-1 MW/m$^2$ of power radiatively, and much of that energy is absorbed through the coating material. There is therefore a need for a reflector that can withstand temperatures above 1000° C. and can reflect peak blackbody radiation at wavelengths of about 2-3 μm, for example.

SUMMARY OF THE INVENTION

The present invention addresses the aforementioned needs in the art, as will now be summarized and then further described in detail below.

Some variations provide an omnidirectional infrared reflector comprising a three-dimensional photonic crystal containing:

rods of a first material that has a first refractive index, wherein the rods are arranged to form a plurality of lattice periods in three dimensions, wherein the rods are connected at a plurality of nodes, wherein the lattice periods are characterized by a lattice spacing, and wherein the rods are characterized by a rod radius or width; and a second material that has a second refractive index that is lower than the first refractive index, wherein the rods are embedded in the second material, wherein the lattice spacing and the rod radius or width are selected to produce a photonic band gap within a selected band of the infrared spectrum.

The photonic band gap may be a complete photonic band gap within the selected band of the infrared spectrum. In some embodiments, the selected band of the infrared spectrum is from about 1 μm to about 15 μm wavelength, such as from about 2 μm to about 3 μm wavelength.

In some embodiments, the lattice spacing is from about 0.5 μm to about 20 μm, such as from about 1 μm to about 3 μm.

In some embodiments, the rod radius or width is from about 50 nm to about 5 μm. The ratio of the rod radius or width to the lattice spacing may be selected from about 0.05 to about 0.50, for example.

The plurality of lattice periods is at least 2 lattice periods, and typically at least 4 lattice periods, in all dimensions. In one or more dimensions, there may be at least 5, 10, 20, 50, 100, or more lattice periods, for example.

In some embodiments, the three-dimensional photonic crystal has a diamond unit cell. In other embodiments, the three-dimensional photonic crystal has a logpile unit cell.

In some embodiments, the first refractive index is at least 2, and the second refractive index is less than the first refractive index.

The first material may be a ceramic material, such as (but not limited to) a ceramic material selected from the group consisting of SiC, SiOC, $Si_3N_4$, SiCN, $TiO_2$, $ZrO_2$, ZnO, and combinations thereof. In some embodiments, the ceramic material is a pyrolyzed form of a preceramic resin, which is optionally a 3D-printed, as discussed in detail later in this specification.

The second material may be selected from the group consisting of air, $MgF_2$, LiF, $CaF_2$, $BaF_2$, $SiO_2$, SiOC, and combinations thereof, for example. In some typical embodiments, the second material is air.

In some embodiments, at least some of the nodes are structural nodes configured to mechanically reinforce the rods. In certain embodiments, all of the nodes are structural nodes configured to mechanically reinforce the rods. The geometry of the structural nodes may be spherical, ellipsoidal, or irregular, for example. The structural nodes may have a structural-node radius or width that is at least 10% larger than the rod radius or width, such as at least 25%, 50%, or 100% larger than the rod radius or width. The structural-node material may be fabricated from the same material as the first material or may be fabricated from a different material. In some embodiments, the structural-node material is selected from the group consisting of SiC, SiOC, $Si_3N_4$, SiCN, $TiO_2$, $ZrO_2$, ZnO, and combinations thereof. The structural-node material optionally has a refractive index within 10% of the refractive index of the first material.

In some embodiments, the omnidirectional infrared reflector is thermally stable when exposed to a temperature of 1300° C. for 24 hours under an air atmosphere at 1 bar pressure.

In some embodiments, the omnidirectional infrared reflector comprises multiple layers each having distinct three-dimensional photonic crystals.

Other variations provide a method of fabricating a three-dimensional photonic crystal, the method comprising:

(a) selecting a three-dimensional photonic crystal unit cell;

(b) providing a preceramic resin that is capable of photopolymerizing upon exposure to light with a wavelength from about 200 nm to about 700 nm;

(c) 3D-printing and photopolymerizing the preceramic resin into a preceramic polymer that is spatially arranged in the geometry of the three-dimensional photonic crystal unit cell; and (d) thermally treating (e.g., pyrolyzing) the preceramic polymer at a temperature from 150° C. to about 1200° C. to convert the preceramic polymer to a ceramic material, thereby generating a three-dimensional photonic crystal.

In some embodiments, step (d) is conducted in an atmosphere containing argon, nitrogen, hydrogen, ethane, propane, ammonia, silanes, or a combination thereof.

The method may further comprise a high-temperature treatment of the three-dimensional photonic crystal, following step (d), at a temperature from 1200° C. to about 1600° C. The high-temperature treatment is optionally conducted in an atmosphere containing argon, nitrogen, hydrogen, ethane, propane, ammonia, silanes, or a combination thereof.

In some methods, the preceramic resin employed in step (b) contains at least one element selected from the group consisting of Si, C, N, Ti, Ge, Zr, and Zn.

In some methods, the three-dimensional photonic crystal produced in step (d) contains:

rods of the ceramic material that has a first refractive index, wherein the rods are arranged to form a plurality of lattice periods in three dimensions, wherein the rods are connected at a plurality of nodes, wherein the lattice periods are characterized by a lattice spacing, and wherein the rods are characterized by a rod radius or width; and a second material that has a second refractive index that is lower than the first refractive index, wherein the rods are embedded in the second material, wherein the lattice spacing and the rod radius or width are selected to produce a photonic band gap within a selected band of the infrared spectrum.

DETAILED DESCRIPTION OF EMBODIMENTS OF THE INVENTION

Figure 1:
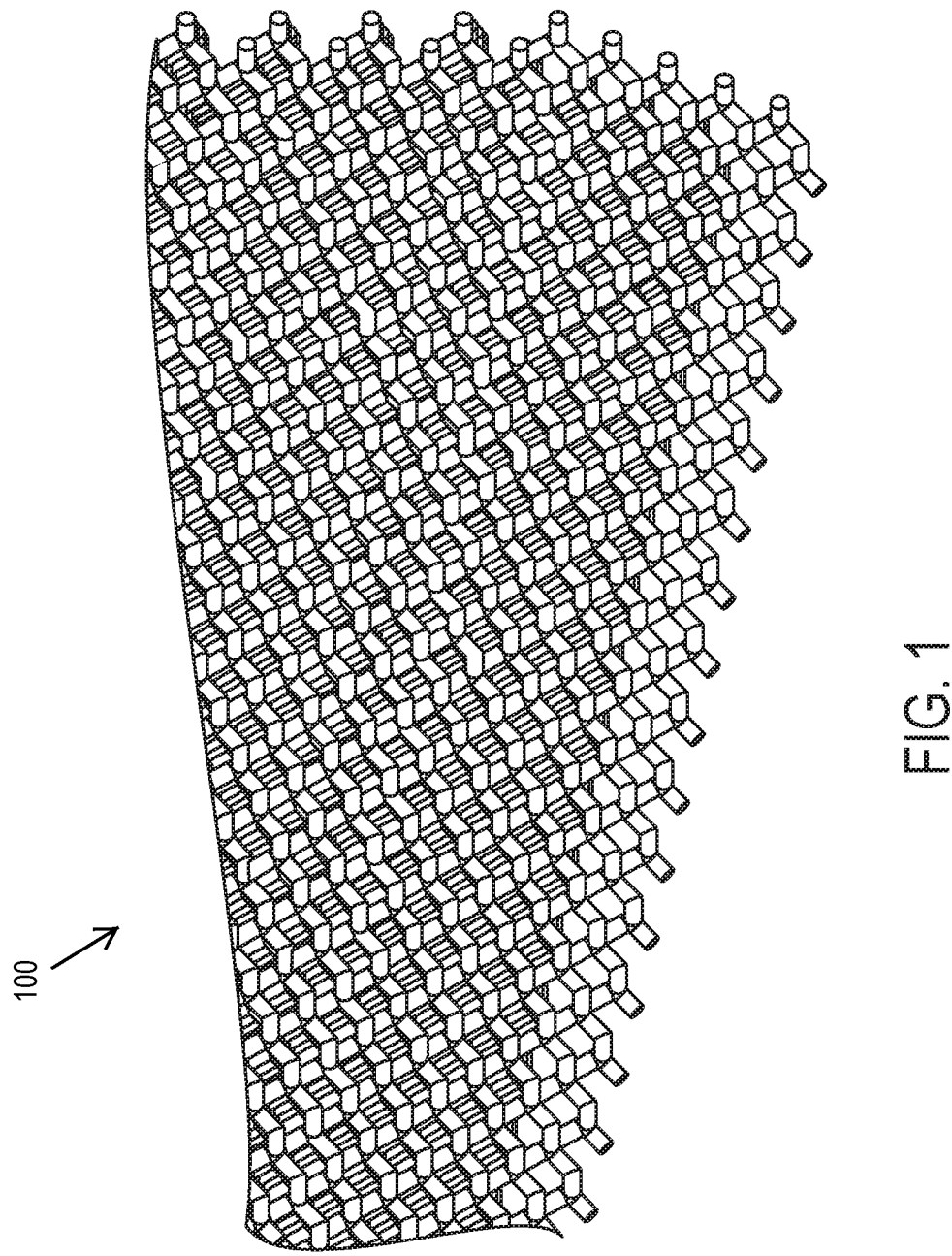
FIG. 1 depicts a diamond lattice 3D photonic crystal, in some embodiments of the invention.

The structures, systems, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Some variations of the present invention provide a structure that can reflect infrared light ("IR") from all incident directions. The structure may be produced by a process comprising directly printing, in three dimensions, a high-refractive-index material on a nanoscale or microscale. This 3D-printing method allows for complex photonic crystal lattices, including (but not limited to) a diamond lattice—thereby overcoming conventional limitations of stacking successive layers and etching each layer to define the photonic crystal lattice. The printed material may be a preceramic polymer that is then converted to a high-temperature ceramic material, thereby enabling applications for which standard IR reflectors fail.

Some variations provide an omnidirectional infrared reflector comprising a three-dimensional photonic crystal containing:

rods of a first material that has a first refractive index, wherein the rods are arranged to form a plurality of lattice periods in three dimensions, wherein the rods are connected at a plurality of nodes, wherein the lattice periods are characterized by a lattice spacing (a), and wherein the rods are characterized by a rod radius or width; and a second material that has a second refractive index that is lower than the first refractive index, wherein the rods are embedded in the second material, wherein the lattice spacing and the rod radius or width are selected to produce a photonic band gap within a selected band of the infrared spectrum.

In this specification, "rods" function as struts within the three-dimensional photonic crystal framework. The rods may have a circular cross-section, an elliptical cross-section, a rectangular cross-section, a square cross-section, a triangular cross-section, or another geometry.

The photonic band gap may be a complete photonic band gap within the selected band of the infrared spectrum. In some embodiments, the selected band of the infrared spectrum is from about 1 µm to about 25 µm, such as from about 2 µm to about 3 µm, or from about 3 µm to about 10 µm, or from about 10 µm to about 25 µm. The photonic band gap is adjustable by selecting the lattice constant in the design of the three-dimensional photonic crystal.

In some embodiments, the lattice spacing a is from about 0.5 µm to about 20 µm, such as from about 1 µm to about 3 µm. In various embodiments, the lattice spacing a is about 0.1, 0.2, 0.5, 1, 1.5, 2, 2.5, 3, 4, 5, 6, 7, 8, 9, 10, 15, 20, or 25 µm, for example. Typically, the lattice spacing is a single value for a given structure, although there may be some deviation from the average value.

In some embodiments, the rod radius or width is from about 50 nm to about 5 µm. In various embodiments, the rod radius or width is about 0.05, 0.1, 0.2, 0.3, 0.4, 0.5, 1, 1.5, 2, 2.5, 3, 4, 5, or 10 µm, for example. When the rods have a circular cross-section (i.e., cylindrical rods), the radius is the cylinder radius. When the rods have an elliptical cross-section, the width may be the short radius, the long radius, or the effective radius. When the rods have a square cross-section, the width is the square side length. When the rods have a rectangular cross-section, the width may be the rectangle width or the effective radius. For other geometries, the rod width is the effective radius (i.e., one-half the effective diameter). Typically, the rod radius or width is a single value for a given structure, although there may be some deviation from the average value. In certain embodiments (e.g., FIG. 10), the rods are essentially, but not perfectly, elliptical in their cross-section.

The ratio of the rod radius or width to the lattice spacing may be selected from about 0.05 to about 0.5, for example, such as about 0.1, 0.2, 0.3, or 0.4.

The plurality of lattice periods is at least 2 lattice periods, and typically at least 4 lattice periods, in all dimensions. In one or more dimensions, there may be at least 5, 10, 20, 50, 100, or more lattice periods, for example.

In some embodiments, the three-dimensional photonic crystal has a "diamond unit cell." A diamond unit cell does not refer to the material of the photonic crystal being diamond (carbon allotrope), but rather a unit cell in which the rod (strut) connectivity resembles the bond pattern in atomic diamond structures. A diamond unit cell can be viewed as a pair of intersecting face-centered cubic lattices, with each separated by one-fourth of the width of the unit cell in each dimension. See FIGS. 1 and 2 for an exemplary diamond lattice structure containing multiple diamond unit cells.

Men et al., "Robust topology optimization of three-dimensional photonic-crystal band-gap structures", *Opt. Express* vol. 22, 22632-22648 (2014), is hereby incorporated by reference herein for its teachings of simulating the photonic band gap of 3D crystalline geometries, and demonstrating that a diamond lattice of struts has an optimal band gap size across a broad range of topologies and refractive indices.

In other embodiments, the three-dimensional photonic crystal has a "logpile unit cell" (also known as a "woodpile unit cell"). In a logpile unit cell, there are multiple layers of rods in which one layer contains parallel rods, and an adjacent layer contains rods that are perpendicular. Also, each set of adjacent layers has a half-spacing shift in lattice constant compared to the next set of adjacent layers above or below the first set of adjacent layers. That is, for a logpile structure with four layers, the first and third layers are parallel to each other and shifted by one-half spacing; the second and fourth layers are parallel to each other and also shifted by one-half spacing; and the second and fourth layers are perpendicular to the first and third layers. See FIGS. 5A and 5B for an exemplary logpile structure containing multiple logpile unit cells. A logpile structure does not generally form as wide of a band gap as the diamond lattice structure.

The structure of the 3D photonic crystal is preferably based on a diamond unit cell or a logpile unit cell. However, the three-dimensional photonic crystal may have other unit cells, such as (but not limited to) a Yablonovite unit cell, a diamond-like unit cells, a logpile-like unit cell in which the alternating sets of adjacent layers are shifted by a spacing other than one-half the lattice gap, a logpile-like unit cell in which adjacent layers are not exactly perpendicular or every other layer is not exactly parallel, and so on. Interpenetrating unit cells of different types may be utilized to form a hybrid unit cell. The methods described below enable the fabrication of unit cells of essentially any selected geometry. It will also be understood that lattice imperfections may arise in one or more individual unit cells of an overall structure; the present invention does not require perfect unit cells.

In some embodiments, the first refractive index is at least 2, and the second refractive index is less than the first refractive index. For example, the first refractive index may be about, or at least about, 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, or 6. The second refractive index may be about, or at most about, 2.5, 2.4, 2.3, 2.2, 2.1, 2, 1.9, 1.8, 1.7, 1.6, 1.5, 1.4, 1.3, 1.2, 1.1, or 1 (and less than the first refractive index). The refractive indices may be average refractive indices within a selected band of the infrared spectrum.

The first material may be a ceramic material, such as (but not limited to) a ceramic material selected from the group consisting of SiC, SiOC, $Si_3N_4$, SiCN, $TiO_2$, $ZrO_2$, ZnO, and combinations thereof. In some embodiments, the ceramic material is a pyrolyzed form of a preceramic resin, which is optionally a 3D-printed.

In embodiments which provide a ceramic material selected from SiC or SiOC, it will be recognized that intermediate materials may be generated in which there is some oxygen content but less than 29 wt %, which is the stoichiometric mass content of oxygen in SiOC. Pure SiC has no oxygen. References in this disclosure to SiC and SiOC will be understood to also include references to materials containing silicon, carbon, and from 0 to about 30 wt % oxygen, such as about 1, 2, 5, 10, 15, 20, 25, 28, 29, or 30 wt % oxygen. In a material containing SiOC, the overall oxygen content in the material can be greater than 30 wt %, such as (but not limited to) when $SiO_2$ is present. Examples 1 and 2 herein give examples of ceramic SiC/SiOC materials that contain various oxygen content.

The second material may be selected from the group consisting of air, $MgF_2$, LiF, $CaF_2$, $BaF_2$, $SiO_2$, SiOC, and combinations thereof, for example. In some typical embodiments, the second material is air, which has a refractive index of about 1. In certain embodiments, the second material is or includes SiOC that has been modified to have a refractive index from about 1.4 to about 1.9, such as via a reactive RF magnetron sputtering technique. In certain embodiments, the first material and second material are both primarily SiOC but with modifications to one or both of the materials such that the refractive index of the second SiOC material is less than the refractive index of the first SiOC material.

In some embodiments, at least some of the nodes are structural nodes configured to mechanically reinforce the rods. In certain embodiments, all of the nodes are structural nodes configured to mechanically reinforce the rods. The geometry of the structural nodes may be spherical, ellipsoidal, or irregular, for example. The structural nodes may have a structural-node radius or width that is at least 10% larger than the rod radius or width, such as at least 25%, 50%, or 100% larger than the rod radius or width. The structural-node material may be fabricated from the same material as the first material or may be fabricated from a different material. In some embodiments, the structural-node material is selected from the group consisting of SiC, SiOC, $Si_3N_4$, SiCN, $TiO_2$, $ZrO_2$, ZnO, and combinations thereof. The structural-node material optionally has a refractive index within 10% of the refractive index of the first material.

In some embodiments, the omnidirectional infrared reflector is thermally stable when exposed to a temperature of 1300° C. for 24 hours under an air atmosphere at 1 bar pressure. In various embodiments, the omnidirectional infrared reflector is thermally stable when exposed to a temperature of 1000° C., 1100° C., 1200° C., 1300° C., 1400° C., 1500° C., or 1600° C. for 24 hours under an air atmosphere at 1 bar pressure.

A photonic crystal as disclosed herein preferably creates a complete photonic band gap, within which no photonic states can exist. Whether a particular 3D photonic crystal has a complete or incomplete photonic band gap depends on the particular lattice type and its parameters (e.g., the size, shape, and spacing of the rods). The band-gap properties of a photonic crystal formed from a given lattice type (e.g., diamond) can be calculated by solved Maxwell's equations for the propagation of electromagnetic waves in a periodic lattice. One technique for determining band gap properties of a 3D photonic crystal based on lattice parameters is described in Ho et al., "Existence of a photonic gap in periodic dielectric structures", *Phys. Rev. Lett.*, Vol. 65, No. 25, 3152-3155 (1990), which is incorporated by reference herein. Temperature effects may be considered in the calculations. If the structure is heated, the radiated blackbody spectrum would be modified by the density of states in the periodic lattice. It can be determined whether there remains no IR emission within the selected band gap as temperature is increased to use temperatures, such as 1000° C. or higher. In certain embodiments, a band gap that is complete at room temperature remains complete at elevated temperatures, or is approximately complete at elevated temperatures, such as 500° C., 800° C., 1000° C., 1200° C., or 1500° C., for example.

In some embodiments, the omnidirectional infrared reflector comprises multiple layers each having distinct three-dimensional photonic crystals. Multiple layers mean at least 2 and potentially 3, 4, 5, 6, 7, 8, 9, 10, or more layers. In some embodiments, the omnidirectional infrared reflector comprises multiple regions each having distinct three-dimensional photonic crystals (e.g., one region with a diamond unit cell and another region with a logpile unit cell).

The present invention, in some embodiments, will now be further described with reference to the accompanying figures, which shall not limit the invention in any way.

FIG. 1 depicts a diamond lattice 3D photonic crystal 100. A diamond lattice is a preferred lattice structure, since a diamond unit cell results in a wide photonic band gap. The diamond lattice is tiled in all three dimensions with lattice periodicity a to produce a 3D photonic crystal 100.

Figure 2:
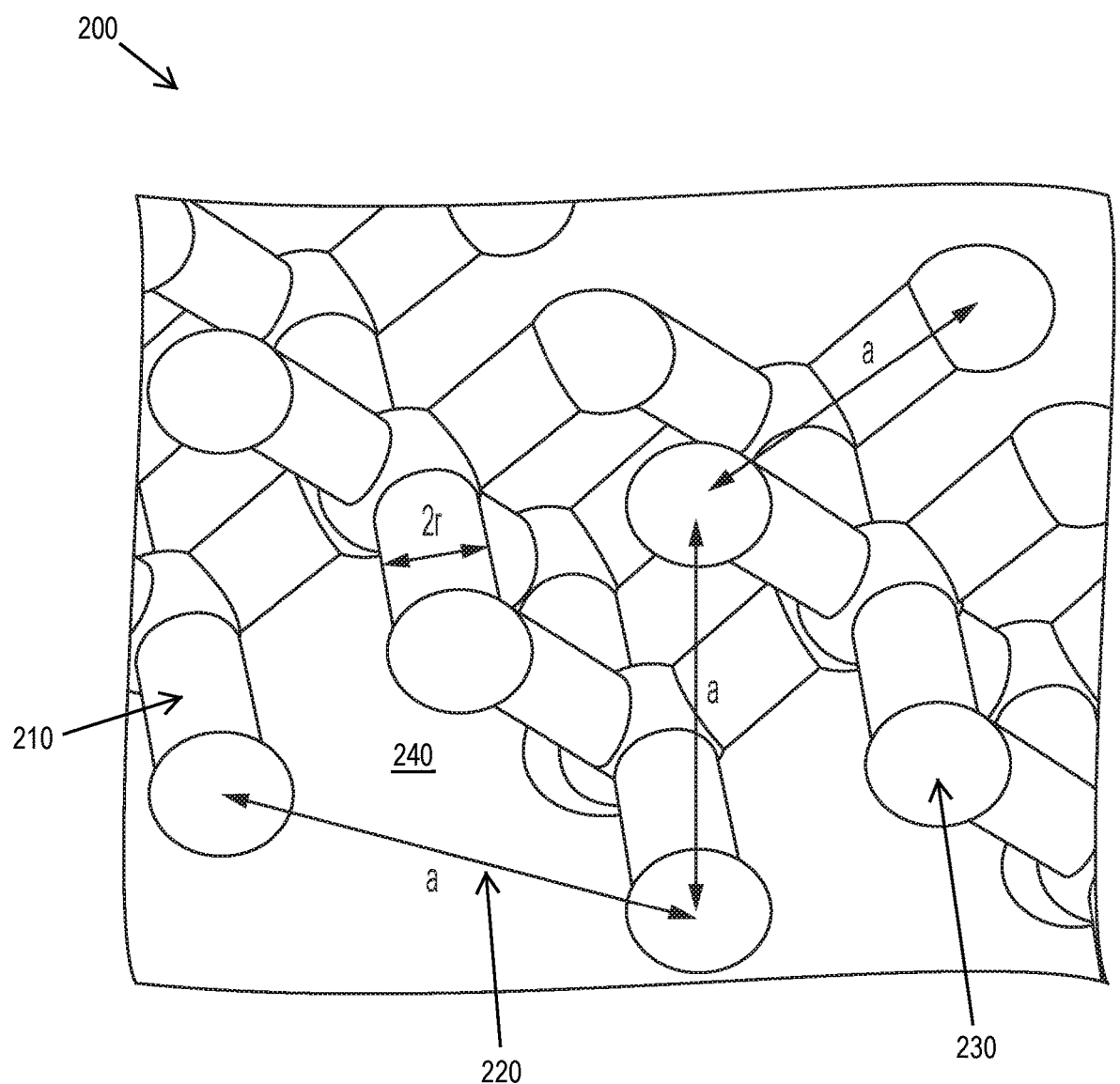
FIG. 2 depicts a close-up view of a diamond lattice 3D photonic crystal, in some embodiments of the invention.

FIG. 2 depicts a close-up view of a diamond lattice 3D photonic crystal 200. In FIG. 2, cylindrical rods 210 (with radius r) are connected at nodes 230. The lattice spacing 220 is denoted as a. The rods 210 are embedded in a second material 240. The nodes 230 (with radius >r) function as structural connectors between rods 210 to improve the durability of the structure 200.

Figure 3:
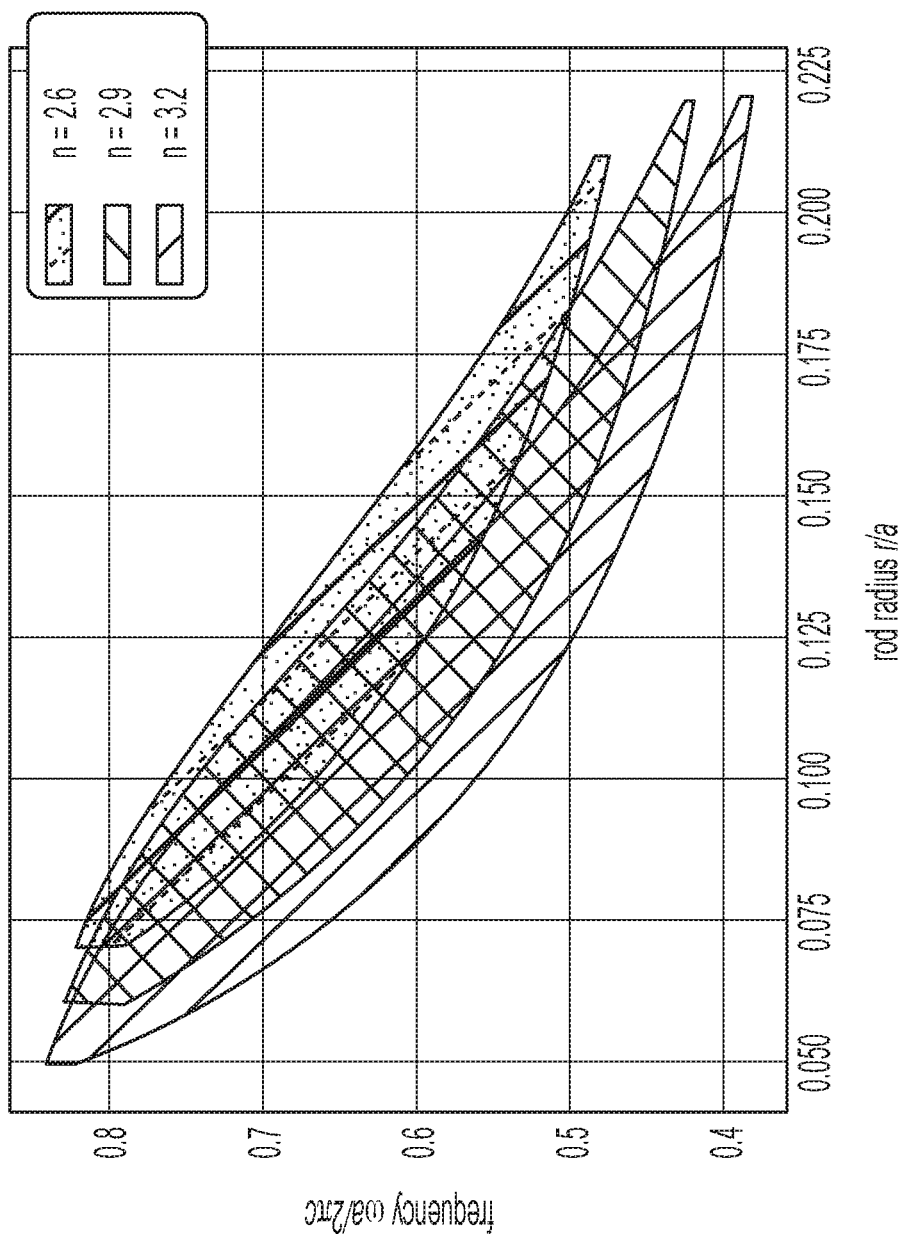
FIG. 3 is a map of band gaps of an exemplary diamond lattice for different refractive indices (n) and dimensions (r/a).

FIG. 3 is a map of band gaps in the structure of FIG. 1 for different refractive indices (n) and dimensions (r/a). The structure of FIG. 1 (and FIG. 2) is defined by two dimensions in the unit cell: the lattice constant, a, and the radius of the cylindrical rods, r. Due to the scale invariance of Maxwell's equations, the optical properties are determined only by the refractive index and the ratio r/a, which is varied along the x-axis of FIG. 3, while the y-axis indicates normalized frequency $\omega a/2\pi c$ ($\omega$=frequency, a=lattice constant, and c=speed of light). In FIG. 3, shaded regions indicate the presence of a complete photonic band gap, for different values of n. The band gap frequencies are tunable by adjusting a for fixed r/a. Due to this scaling property, an appropriate measure of band gap size is the ratio between the band gap width and the center frequency, which is invariant with lattice constant. Assuming the medium is air (n=1.0003), a material with n=2.6 has a maximum band gap ratio of 15%. This means that if the center of the gap is chosen to be 2 μm wavelength, the gap covers 1.85 μm to 2.15 μm.

Figure 4:
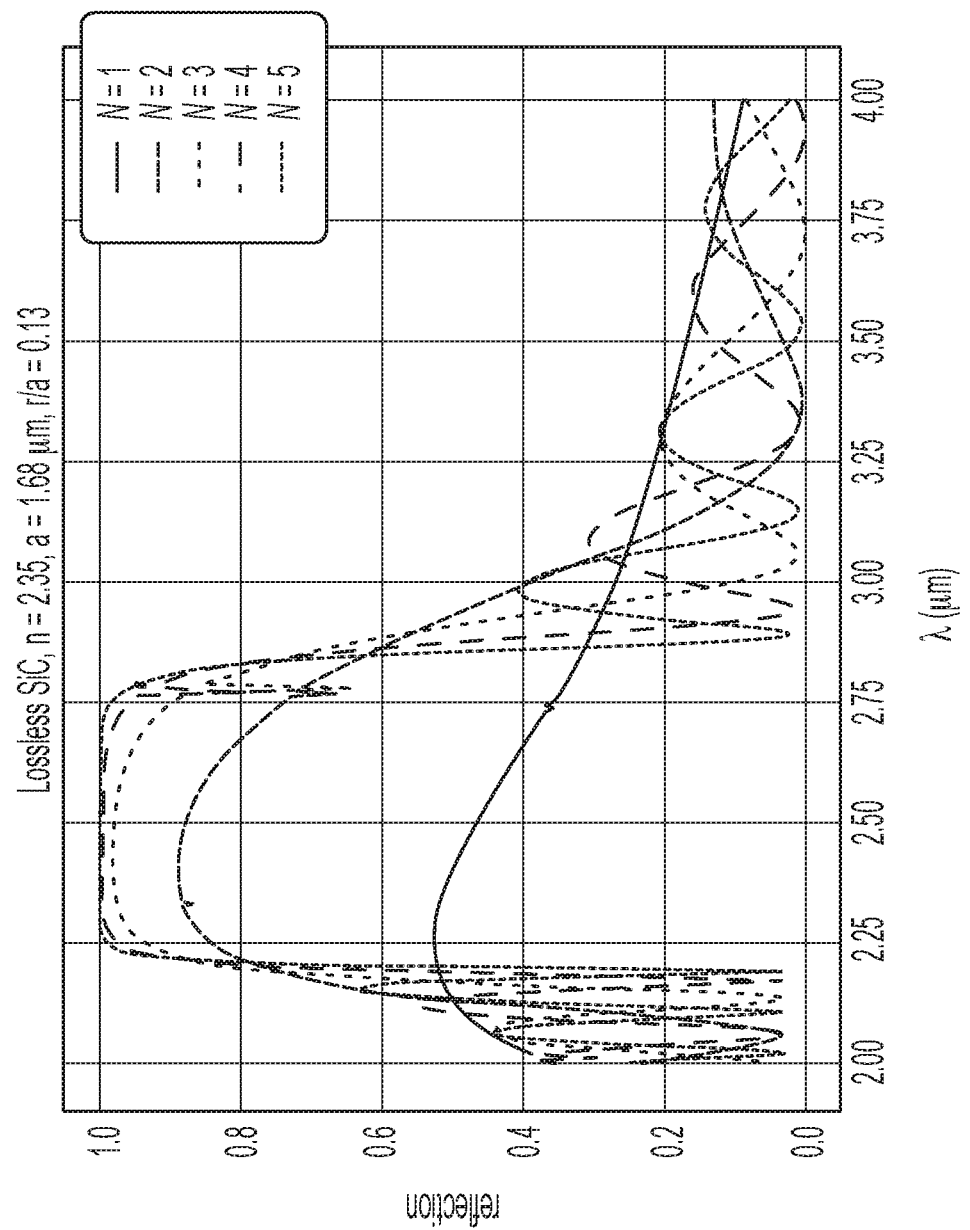
FIG. 4 is a graph of calculated reflection spectra for an exemplary diamond lattice tuned to have a mid-gap wavelength of 2.5 µm, as a function of number of lattice periods along the propagation direction.

FIG. 4 is a graph of calculated reflection spectra for a diamond lattice (connected rods) tuned to have a mid-gap wavelength of 2.5 μm, as a function of number of lattice periods along the propagation direction. The SiC strut material is assumed to have no losses (k=0) and a refractive index n=2.35. The geometric ratio r/a=0.13, with the lattice constant set at a=1.68 μm to tune the mid-gap wavelength to 2.5 μm. In this plot, the number of lattice periods in the direction of light propagation is varied from N=1 to N=5 (N is number of unit cells), with the structure achieving near-perfect reflection once N=4, corresponding in this case to a total material thickness of less than 7 μm.

Figure 5B:
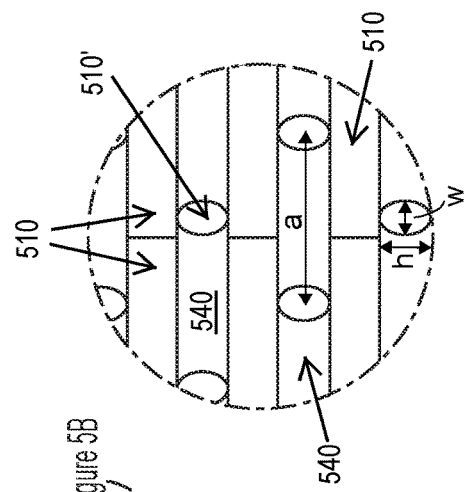
FIG. 5B shows the logpile unit cell of FIG. 5A.
Figure 5A:
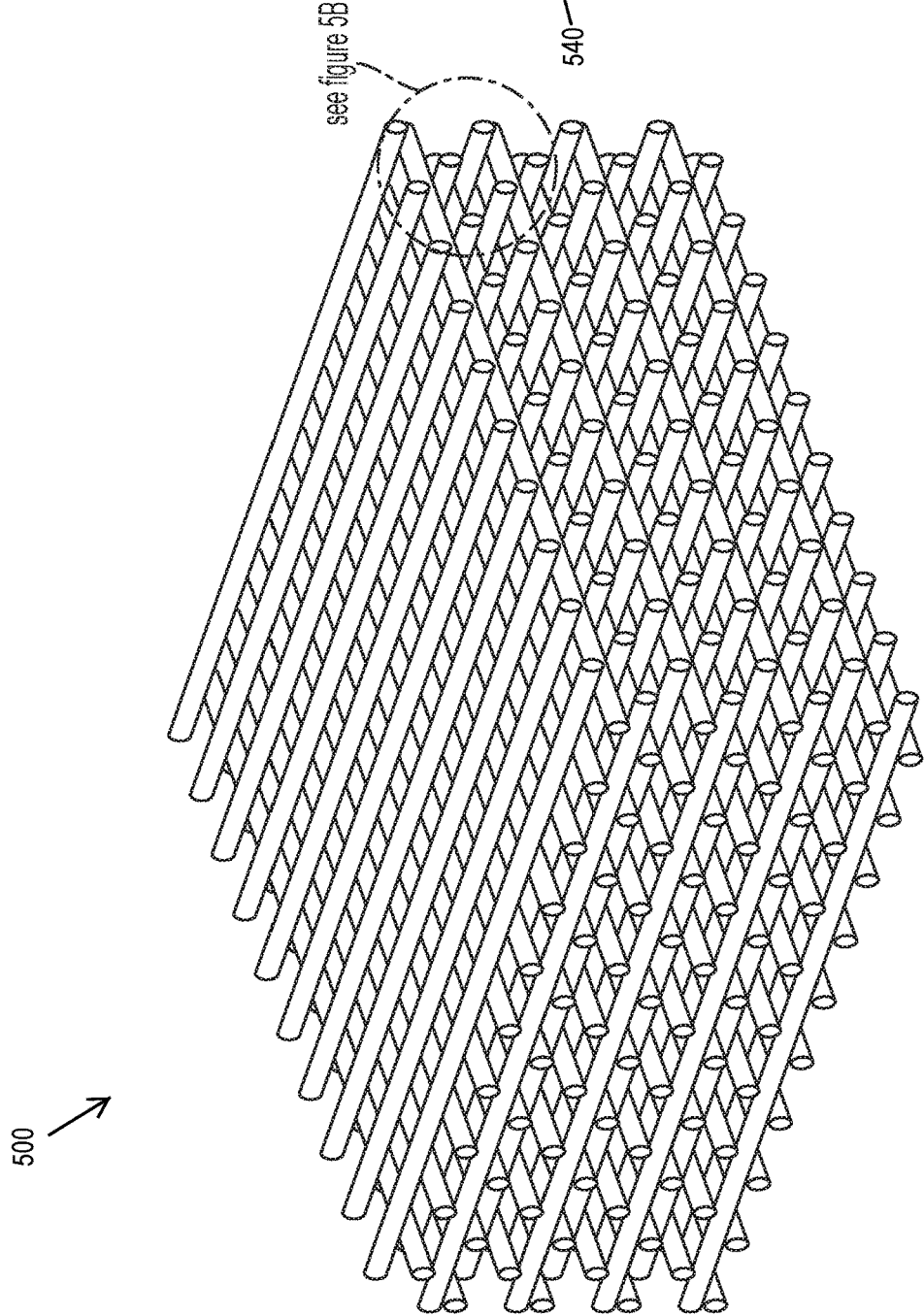
FIG. 5A depicts a logpile lattice 3D photonic crystal, in some embodiments of the invention.

FIG. 5A depicts a logpile lattice 3D photonic crystal 500. The inset of FIG. 5A is shown as FIG. 5B, showing that the logpile unit cell is composed of rods with width w and height h, and lattice spacing a. In FIG. 5B, the rod (strut) material 510 in one layer is perpendicular to the rod material 510' in an adjacent layer. The rods 510/510' are embedded in the second material 540. The one-half spacing shift between sets of adjacent layers is shown in FIG. 5B.

Figure 6:
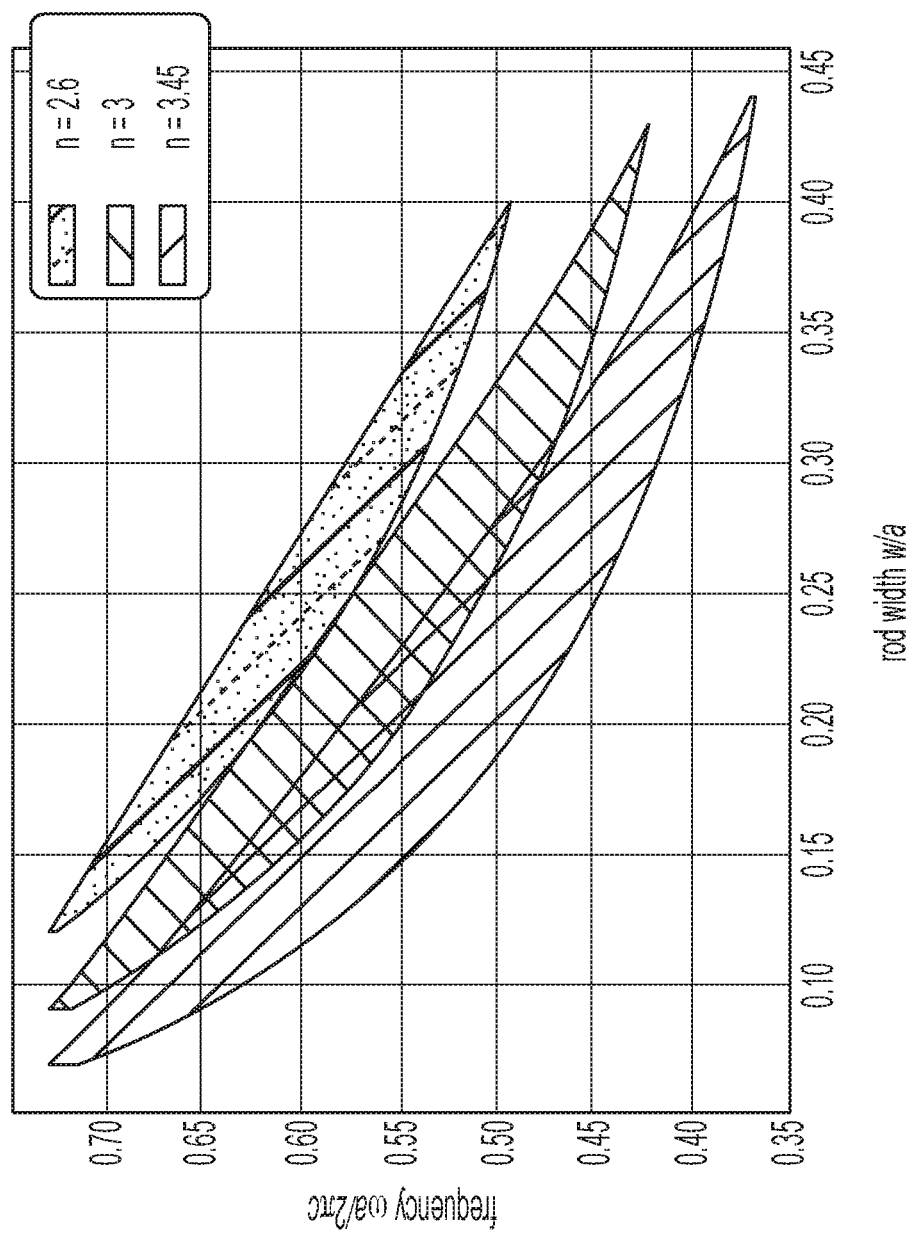
FIG. 6 is a map of band gaps for different dimensions and refractive indices of a logpile unit cell, in some embodiments of the invention.

FIG. 6 is a map of band gaps for different dimensions and refractive indices of a logpile unit cell. The height of the rods, h, is set to a constant h=0.25a, while the width of the rods, w, is varied. The logpile structure shows a smaller band gap than the diamond lattice structure. For an index of n=2.6, the band gap is less than 8%, about half of the band gap of a diamond lattice.

Some variations of the invention provide a method of fabricating a three-dimensional photonic crystal, the method comprising:

(a) selecting a three-dimensional photonic crystal unit cell;

(b) providing a UV-curable preceramic resin that is preferably capable of photopolymerizing upon exposure to light with a wavelength from about 200 nm to about 700 nm;

(c) 3D-printing and photopolymerizing the preceramic resin into a preceramic polymer that is spatially arranged in the geometry of the three-dimensional photonic crystal unit cell; and (d) pyrolyzing the preceramic polymer at a temperature from 150° C. to about 1200° C. to convert the preceramic polymer to a ceramic material, thereby generating a three-dimensional photonic crystal.

In some methods, the three-dimensional photonic crystal produced in step (d) contains:

rods of the ceramic material that has a first refractive index, wherein the rods are arranged to form a plurality of lattice periods in three dimensions, wherein the rods are connected at a plurality of nodes, wherein the lattice periods are characterized by a lattice spacing, and wherein the rods are characterized by a rod radius or width; and a second material that has a second refractive index that is lower than the first refractive index, wherein the rods are embedded in the second material, wherein the lattice spacing and the rod radius or width are selected to produce a photonic band gap within a selected band of the infrared spectrum.

In some embodiments, step (d) is conducted in an atmosphere containing argon, nitrogen, hydrogen, ethane, propane, ammonia, silanes, or a combination thereof.

The method may further comprise a high-temperature treatment of the three-dimensional photonic crystal, following step (d), at a temperature from 1200° C. to about 1600° C. The high-temperature treatment is optionally conducted in an atmosphere containing argon, nitrogen, hydrogen, ethane, propane, ammonia, silanes, or a combination thereof.

"Preceramic" in this disclosure simply refers to the capability to be ultimately converted to a ceramic material. It is noted that the disclosed preceramic resin formulations are precursors to preceramic polymers, which themselves are precursors to ceramic materials. As intended herein, a "resin" means a composition capable of being polymerized or cured, further polymerized or cured, or crosslinked. Resins may include monomers, oligomers, prepolymers, or mixtures thereof.

Note that in this disclosure, all references to "UV," "UV-curable," "UV-cure-based" and the like shall include reference not only to ultraviolet radiation but also other electromagnetic radiation bands that can be effective for photopolymerization in various embodiments, including microwave radiation, terahertz radiation, infrared radiation, visible radiation (light), ultraviolet radiation, and X-rays.

In some methods, the UV-curable preceramic resin employed in step (b) contains at least one element selected from the group consisting of Si, C, N, Ti, Ge, Zr, and Zn.

Preceramic monomers such as siloxanes, silazanes, carbosilanes, or combinations thereof may be converted into UV-curable preceramic resins by adding UV active functionalities, such as vinyl, allyl, methacrylate, acrylate, epoxy, and/or thiol groups. By using a UV-curable preceramic resin, structures may be written directly using stereolithography, two-photon lithography, or multi-beam interference lithography, for example. For example, advances in two-photon lithography allow 3D printing of UV-curable preceramic resins with sub-micron resolution.

See Eckel et al., "Additive manufacturing of polymer-derived ceramics", Science Vol. 351, Issue 6268, Pages 58-62 (Jan. 1, 2016), as well as Eckel et al., U.S. Patent App. Pub. No. 2018/0148380 A1, published on May 31, 2018, each of which is hereby incorporated by reference for teaching some exemplary UV-curable preceramic resins that may be employed in the present invention.

Various UV-curable preceramic resins will now be further described. These UV-curable preceramic resins may be utilized in step (b) of the method set forth above. In certain embodiments, a disclosed UV-curable preceramic resin may be provided as a composition for use in fabricating a 3D photonic crystal, or potentially for use in fabricating a 2D or 1D photonic crystal.

In various embodiments, a UV-curable preceramic resin for fabricating a three-dimensional photonic crystal includes a UV-curable preceramic resin that provides the main ceramic framework upon pyrolysis. The UV-curable preceramic resin may include one or more monomers, oligomers, or polymers that comprise at least one Si—C, Si—N, Si—O, or Si—S bond within some or all of the backbone repeat units. The side-chain groups of the molecules in the resin may be hydrogen, inorganic functional groups, and/or organic functional groups, for example. The organic or inorganic functional groups may be UV-active functional groups, such as vinyl, allyl, methacrylate, acrylate, epoxy, and/or thiol groups. In various embodiments, the side-chain groups of the molecules in the resin are selected from the group consisting of hydrogen, halides, substituted cyclic or acyclic hydrocarbon groups, unsubstituted cyclic or acyclic hydrocarbon groups, aryl groups, groups containing unsaturated C=X double bonds, groups containing unsaturated CX triple bonds, and combinations thereof, wherein X may be C, S, O, or N. The UV-curable preceramic resin may contain combinations of different unsaturated bonds. Of these different unsaturated bonds, typical bonds are C=C double bonds at the terminal position, in which three substitutions on the C=C bonds are hydrogen atoms.

Specific examples of a preceramic resin include polycarbosilanes; polymethylcarbosilane; polyallylcarbosilane; allylhydridopolycarbosilane; trivinylborazine; 2,4,6-trimethyl-2,4,6-trivinylcyclotrisilazane; 1,3,5,7-tetravinyl-1,3,5,7-tetramethylcyclotetrasilazane; B,B'B"-trithynyl-N,NN"-trimethylborazine; B,B'B"-triethynylborazine; 1,2,3,4,5,6-hexamethylcyclotrisilazane; 1,1,3,3,5,5-hexamethylcyclotrisilazane; 1,2-dimethylsilazane; 1,1-perhydrosilazane; 1,3-divinyl-1,3-diphenyl-1,3-dimethyldisilazane; 1,3-divinyl-1,1,3,3-tetramethyldisilazane; 1,3,5,7-tetravinyl-1,3,5,7-tetramethylcyclotetrasilazane; 1,1,3,3,5,5,7,7-octamethylcyclotetrasilazane; or combinations or derivatives thereof. Note that any resins disclosed herein may be provided in monomer, oligomer, or polymer form. Specific examples of UV-active functional groups include 4-vinyl-1-cyclohexene-1,2-epoxide; 1,2-epoxy-5-hexene; 2-methyl-2-vinyl-oxetane; allyl methacrylate; allyl acrylate; vinyl acrylate; vinyl methacrylate; acrylic acid; methacrylic acid; allyl mercaptan; 3,4-epoxy-1-butene; vinyl; allyl; acrylate; methacrylate; or combinations or derivatives thereof.

The UV-curable preceramic resin may be included in a UV-curable preceramic formulation that may include other components, as described below. A UV-curable preceramic formulation may contain from about 1 wt % to about 100 wt % of the UV-curable preceramic resin.

In various embodiments, a UV-curable preceramic formulation for fabricating a three-dimensional photonic crystal includes a catalyst. In some embodiments, the catalyst aids in crosslinking and/or polymerization of the UV-curable preceramic resin. In some embodiments, the catalyst increases the rate of vinyl addition. The catalyst may be a homogeneous and/or a heterogeneous catalyst. The catalyst may include a metal complex of the form M-L, wherein metal M is selected from the transition metals, such as Pt, Pd, Ru, Rh, Ni, and/or Co; and wherein ligand L is selected from halides, alkyl groups, aryl groups, aliphatic unsaturated groups, carbon monoxides, and/or organosilicon groups. The catalyst may be in the form of a metal salt. The catalyst may be in the form of metal particles supported on a catalyst support, such as silica, alumina, zeolites, carbon, or a combination thereof. Specific examples of catalysts include Pt on silica; Pt on alumina; Pt on activated carbon; Pt on SBA-15 (mesoporous silica); Pt or Pd on MCM-41 (mesoporous silicate-alumosilicate hierarchical material); chloroplatinic acid hydrate (Speier's catalyst); platinum(0)-1,3-divinyl-1,1,3,3-tetramethyldisiloxane complex solution (Karstedt's catalyst); tris(triphenylphosphine)-rhodium(I) chloride; benzylidenebis(tricyclohexylphosphine)dichlororuthenium(II); dichloro(1,5-cyclooctadiene)platinum(II); or combinations thereof. When present, the catalyst may be present in a concentration from about 0.00001 wt % to about 5 wt % of the UV-curable preceramic formulation.

In various embodiments, a UV-curable preceramic formulation for fabricating a three-dimensional photonic crystal includes a photoinitiator that generates free radicals under light exposure by intramolecular bond cleavage and/or intermolecular hydrogen abstraction from light having a wavelength from about 200 nm to about 700 nm, such as from about 200 nm to about 500 nm. A combination of different types of photoinitiators may be used in the polymerization process, such as to provide different rates of reactions initiated by different photoinitiators, or to allow multi-wavelength curing. Specific examples of photoinitiators include 2,2-dimethoxy-2-phenylacetophenone; 2-hydroxy-2-methylpropiophenone; camphorquinone; bis(2,4,6-trimethylbenzoyl)-phenylphosphineoxide; benzophenone;

benzoyl peroxide; thioxanones; or combinations or derivatives thereof. When present, the photoinitiator is present in a concentration from about 0.00001 wt % to about 10 wt % of the UV-curable preceramic formulation.

In various embodiments, a UV-curable preceramic formulation for fabricating a three-dimensional photonic crystal includes a UV sensitizer. The UV sensitizer may be included in the formulation to enable the long-UV-wavelength reaction of UV systems with photoinitiators which typically absorb at lower wavelengths, thereby broadening the photoreactivity of the formulation. This is typically the case with cationic photoinitiators, which are limited to absorption at narrow bands, such as about 355 nm. UV sensitizers interact with UV light at higher wavelengths, generally at 400 nm or higher, and then interact with the photoinitiator to create either free radicals or acids. A UV sensitizer forms an excited triplet state under UV light absorption; through electron or energy transfer, the UV sensitizer reacts with a photoinitiator to generate free radicals and/or Brønsted acids, initiating photopolymerizaton. Specific examples of UV sensitizers include dibutoxyantracene; diethoxyanthracene; 1-chloro-4-propoxythioxanthone; 2-isopropylthioxanthone; 4-isopropylthioxanthone; or combinations or derivatives thereof. When present, the UV sensitizer is present in a concentration from about 0.00001 wt % to about 10 wt % of the UV-curable preceramic formulation. The molar ratio of UV sensitizer to photoinitiator may be from about 0.01 to about 2, such as about 0.1 to about 1, for example.

In various embodiments, a UV-curable preceramic formulation for fabricating a three-dimensional photonic crystal includes a free-radical thermal initiator that generates free radicals under elevated temperature conditions (e.g., a thermal post-cure at 300° C. after 3D printing). The addition of a free-radical thermal initiator allows for multiple-mechanism curing in the formulation, i.e., both UV curing and thermal curing. A free-radical thermal initiator may be used to crosslink unreacted vinyl groups that have not reacted with a thiol group, for example. A free-radical thermal initiator may be used (optionally with a catalyst, e.g. a Pt complex) to react the vinyl groups with other available functional groups such as hydrogen or methyl groups, thereby initiating a second type of reaction. A combination of different types of free-radical thermal initiators may be used, if desired. Specific examples of free-radical thermal initiators include benzoyl peroxide; dicumyl peroxide, 2,2'-azobisisobutyronitrile; platinum carbonyl cyclovinylmethylsiloxane complex; platinum divinyltetramethyldisiloxane complex; or combinations or derivatives thereof. When present, the free-radical thermal initiator is present in a concentration from about 0.00001 wt % to about 10 wt % of the UV-curable preceramic formulation.

In various embodiments, a UV-curable preceramic formulation for fabricating a three-dimensional photonic crystal includes a free-radical inhibitor. The free-radical inhibitor may be included in the formulation to inhibit unwanted polymerization of regions outside the desired printing area so as to allow sufficient resolution to the desired lattice structure. In preferred embodiments, the free-radical inhibitor is an antioxidant. Specific examples of free-radical inhibitors include hydroquinone; methylhydroquinone; ethylhydroquinone; methoxyhydroquinone; ethoxyhydroquinone; monomethylether hydroquinone; propylhydroquinone; propoxyhydroquinone; tert-butylhydroquinone; n-butylhydroquinone; or combinations or derivatives thereof. When present, the free-radical inhibitor is present in a concentration from about 0.00001 wt % to about 1 wt % of the UV-curable preceramic formulation.

In various embodiments, a UV-curable preceramic formulation for fabricating a three-dimensional photonic crystal includes a 3D-printing resolution agent. A "3D-printing resolution agent" is a compound that improves print quality and resolution by containing the curing to a desired region of the laser or light exposure. In certain embodiments, the 3D-printing resolution agent functions by absorbing light (e.g., UV or visible light) at a desired wavelength and converting the energy either into thermal energy or radiation at a higher wavelength. The use of 3D-printing resolution agents improves print quality and resolution by containing the curing by the laser or light exposure to the desired region laterally and/or vertically in the print bath. The 3D-printing resolution agent may be selected from UV absorbers, fluorescents, optical brighteners, or a combination thereof. Specific examples of 3D-printing resolution agents include 2-(2-hydroxyphenyl)-benzotriazole; 2-hydroxyphenyl-benzophenones; 2-hydroxyphenyl-s-triazines; 2,2'-(2,5-thiophenediyl)bis(5-tert-butylbenzoxazole); 2,2'-(1,2-ethenediyl)bis(4,1-phenylene)bisbenzoxazole; or a combination thereof. When present, the 3D-printing resolution agent is present in a concentration from about 0.00001 wt % to about 10 wt % of the UV-curable preceramic formulation.

In various embodiments, a UV-curable preceramic formulation for fabricating a three-dimensional photonic crystal includes a solid-phase filler. Solid-phase fillers may provide various benefits, such as reducing curing and pyrolysis shrinkage, increasing fracture toughness of the resulting ceramic, and/or seeding and aiding crystallization when an amorphous or semi-crystalline ceramic material is subjected to a high-temperature treatment (e.g., greater than 1200° C.) to enhance crystallinity. Preferably, the solid-phase filler is a stable solid at the selected pyrolysis temperature (e.g., 750° C. or greater) so that the solid-phase filler does not disintegrate, melt, or vaporize during pyrolysis.

The optional solid-phase filler may have a range of compositions, including (but not limited to) silicon-based ceramics, non-silicon-based ceramics, carbide-based ceramics, nitride-based ceramics, or combinations thereof. Silicon-based ceramics for the solid-phase filler include, but are not limited to, SiOC, $SiO_2$, SiCN, SiC, or SiCBN. Non-silicon-based ceramics for the solid-phase filler include, but are not limited to, alumina, zirconia, titania, or other metal oxides. Carbide-based ceramics for the solid-phase filler include, but are not limited to, carbon, diamond, TiC, ZrC, HfC, or other metal carbides. Nitride-based ceramics for the solid-phase filler include, but are not limited to, $Si_3N_4$, TiN, ZrN, or other metal nitrides.

When present, the solid-phase filler is present in a concentration from about 0.1 vol % to about 70 vol % of the UV-curable preceramic formulation, such as from about 1 vol % to about 50 vol % of the UV-curable preceramic formulation.

The solid-phase filler particles may be from about 10 nanometers to about 1000 microns in average particle size. To increase the omnidirectional reflectivity in the final ceramic material, solid-phase filler average particle sizes of about 100 microns or less, about 10 microns or less, or about 1 micron or less, are preferred. The geometric shape of the solid-phase filler may be spherical particles, fibers, whiskers, nanotubes, nanorods, or flat platelets, for example.

Particle sizes, rod widths, and lattice constants may be measured by a variety of techniques, including dynamic light scattering, laser diffraction, or image analysis, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

In some embodiments, the solid-phase filler actively seeds crystallization of a preferred ceramic phase by enabling epitaxial growth of the preferred phase without a nucleation barrier. After pyrolysis of preceramic polymers, an amorphous ceramic is usually obtained. To increase strength and hardness, and reduce high-temperature creep, the amorphous ceramic material may be crystallized, or a semi-crystalline material further crystallized, into a preferred ceramic phase. This may be achieved by a high-temperature heat treatment, such as at a temperature above the pyrolysis temperature, performed right after the pyrolysis or at a later time. Such crystallization may be facilitated by seeding crystallization. Without limitation, the mechanism may include providing a surface for epitaxial growth of the preferred phase or multiple ceramic phases. For example, the crystallization of β-SiC in an amorphous SiC or SiCN ceramic derived from a polycarbosilane-based or polysilazane-based resin may be facilitated by small (e.g., 1 nanometer to 5 microns) β-SiC crystals. As another example, crystallization of the α phase or β phase of $Si_3N_4$ in an amorphous $Si_3N_4$ or SiCN ceramic derived from a polysilazane-based resin can be facilitated by small (e.g., 50 nanometers to 5 microns) $\alpha$-$Si_3N_4$ or $\beta$-$Si_3N_4$ crystals, respectively. Other solid-phase fillers may be chosen to facilitate crystallization, with the typical constraint of epitaxial growth on one crystal facet with low lattice strain. Crystallization of an amorphous or semi-crystalline material may be performed at temperatures from about 1200° C. to about 2000° C., such as from about 1300° C. to about 1600° C. The crystallization may take from about 1 hour to about 100 hours, for example, depending on temperature and the material being crystallized.

The UV-curable preceramic formulations disclosed herein may be 3D printed using many different methods. Preferred methods include stereolithography, two-photon lithography, multi-beam interference lithography, binder jetting, polyjetting, or a combination thereof.

Stereolithography is a 3D-printing technique to fabricate a part in a layer-by-layer fashion using photochemical processes by which light (e.g., UV light) causes monomers and oligomers to polymerize or crosslink together to form polymers. In stereolithography, layers of preceramic resin are cured from the top or bottom using UV-laser rastering, projection micro-stereolithography, digital light projection, or liquid crystal device projection, for example.

In two-photon lithography, or generally multiphoton lithography, structuring is accomplished by illuminating negative-tone or positive-tone photoresists via light of a defined wavelength. Two-photon absorption is utilized to induce a change in the solubility of the resist. This method relies on a multi-photon absorption process in a material that is transparent at the wavelength of the laser used for creating the pattern. By scanning and properly modulating the laser, polymerization occurs at the focal spot of the laser and can be controlled to create an arbitrary three-dimensional periodic pattern. Multiphoton lithography is useful for creating small lattice features in a photosensitive material, without the use of complex optical systems or photomasks.

In multi-beam interference lithography, an interference pattern between two or more coherent light waves is set up and recorded in a photoresist layer. This interference pattern consists of a periodic series of fringes representing intensity minima and maxima. Upon post-exposure photolithographic processing, a photoresist pattern corresponding to the periodic intensity pattern emerges. This method is based on the interference of multiple coherent beams originating from diffraction of large-diameter collimated beam on a transmission phase mask. Parameters of the phase mask (periods and modulation depth) are selected to yield an interference pattern with high contrast and narrow well-separated maxima. Multi-beam interference lithography is a technique for patterning periodic arrays of fine lattice features, without the use of complex optical systems or photomasks.

Generally speaking, "jetting" of a material means that droplets of a build material are selectively deposited onto a build bed to develop a three-dimensional object. Jetting may be carried out by liquid deposition, vapor deposition, or liquid-vapor mist deposition, for example, via spraying (such as via a nozzle in communication with a material under pressure), impingement (such as via a tube or pipe in communication with a material that is pumped), or other means. In binder jetting, a preceramic resin is jetted on selected locations and cured such as via UV light or thermally. This process is similar to conventional binder jetting methods, but instead of a binder, a preceramic resin is used. After an initial step of binder jetting, another layer of the preceramic resin may be spread out on a 3D-printed polymer layer, followed by resin jetting and curing. This process may be repeated many times for large structures. In polyjetting, a mixture of liquid preceramic resin is jetted and written into the desired pattern. As the mixture is dispensed, it is exposed to UV light such as a laser, LED, or plasma sources, and cured into a polymer. Multiple mixtures are able to be dispensed through different nozzles, allowing for more than one type of resin to be utilized simultaneously. This results in tailored mechanical properties for the final ceramic structure (following pyrolysis).

Typically, but not necessarily, a preceramic formulation is conveyed (printed) to a region of interest, such as via stereolithography or multiphoton lithography, either followed by polymerization or with polymerization taking place simultaneously with the printing. Preferably, the photopolymerizing and 3D printing sub-steps of step (c) are performed simultaneously, at a desired location (e.g., a layer) within a part. In some embodiments, the polymerizing and 3D printing sub-steps are performed semi-simultaneously, in which the method is carried out multiple times overall while during each iteration, some amount of printing and some amount of polymerizing takes place. It is also possible, in some embodiments, to first polymerize a preceramic resin, followed by 3D printing of the already-made polymer—especially when the polymer is a thermoplastic material. In any case, the 3D printing and photopolymerizing of the preceramic resin results in a preceramic polymer that is spatially arranged in the geometry of the selected three-dimensional photonic crystal unit cell.

In some embodiments, the curing or conversion of preceramic resin formulation to preceramic polymer includes crosslinking. A crosslink is a bond that links one polymer chain to another. Crosslink bonds can be covalent bonds or ionic bonds. When polymer chains are linked together by crosslinks, they lose some of their ability to move as individual polymer chains. Crosslinks are the characteristic property of thermosetting plastic materials. In most cases, crosslinking is irreversible, unless ionic bonds are employed in reversible crosslinks.

In some embodiments, while a monomer is being converted to polymer, a gel is formed first. Gel formation is followed by formation of a solid material as the monomer conversion is further increased, to crosslink chains together. A "gel" is a solid, jelly-like material that can have properties ranging from soft and weak to hard and tough. Gels exhibit no flow when in the steady-state. By weight, gels are mostly liquid, yet they behave like solids due to a three-dimensional crosslinked network within the liquid. The gel may have approximately the geometry of the selected three-dimensional photonic crystal unit cell.

After a part is 3D printed using any of the above methods, or another method, the part may be thermally post-cured, prior to pyrolysis to produce the ceramic structure. A post-cure step may be employed to crosslink unreacted functional groups, for example. Post-curing may be accomplished by additional UV exposure and/or by a thermal post-cure at elevated temperatures (such as 60-500° C.) in an oven for about 10 minutes to about 8 hours. When a thermal post-cure is used, it can be beneficial to include a thermal initiator in the initial preceramic resin, to facilitate later thermal curing.

The direct, near-net-shape conversion of a preceramic 3D-printed polymer to a ceramic structure may be achieved by pyrolysis or other thermal treatment, such as (but not limited to) sintering, annealing, or calcination. Typically, the thermal treatment is based on heating the 3D-printed structure for an extended period of time under various inert or reactive atmospheres. The resulting ceramic structure is, or includes, a three-dimensional photonic crystal.

Thermal treatment may be done for an extended period of time under various atmospheres, including but not limited to $N_2$, Ar, He, air, $CO_2$, $CH_4$, $C_2H_6$, $C_2H_4$, $NH_3$, or a combination thereof. Treatment pressures may vary from about 1 bar to about 20 bar, for example. Vacuum pyrolysis may also be employed, in which the treatment pressure is less than 1 bar, optionally under various atmospheres, including but not limited to $N_2$, Ar, He, air, $CO_2$.

The pyrolysis or other thermal treatment may include heating at a heating rate of 0.1-20° C./min from ambient temperature to an elevated temperature from about 150° C. to about 1500° C., such as from about 500° C. to about 1200° C. In some embodiments, slow heating rates (e.g., less than 10° C./min) enable volatile gases to escape, thereby minimizing porosity in the final part. When porosity is desired, higher heating rates (e.g., higher than 20° C./min) may be employed.

The pyrolysis or other thermal treatment may also include dwelling at the elevated temperature (e.g., 950° C.) for at least about 1, 10, 30, or 60 minutes, or at least about 1, 2, 3, 4, 5, 6, 7, or 8 hours, or longer.

Following thermal treatment, the material may be cooled at a cooling rate (magnitude) of 0.1-20° C./min back to ambient temperature. In some embodiments, faster cooling (e.g., higher than 20° C./min in magnitude) is desired to freeze-in a desired microstructure, for example.

In some embodiments, a first thermal treatment is carried out at a first temperature, such as from about 150° C. to about 1100° C., e.g. about 300° C. to about 1000° C., to produce an amorphous or semi-crystalline ceramic material. Then, a second thermal treatment is carried out at a second temperature that is higher than the first temperature, such as from about 1100° C. to about 2000° C., e.g. about 1200° C. to about 1600° C. As discussed earlier, the second thermal treatment may enable the further crystallization of the amorphous or semi-crystalline ceramic material into a crystalline ceramic material. The first thermal treatment may be under an inert or reactive atmosphere, while the second thermal treatment is typically under an inert atmosphere. Heating rates for both first and second thermal treatments may be from about 0.1-20° C./min. The dwell time for both first and second thermal treatments may be from about 15 minutes to about 5 hours, for example, depending on the size and cross section of the ceramic structure. A typical dwell time is about 1 hour for each of the first and second thermal treatments.

The thermal treatment is preferably performed following polymerization and any (optional) thermal post-cure of the 3D-printed preceramic polymer. In certain embodiments, the thermal treatment is combined (i.e., overlaps in time and/or temperature) with polymerization, thermal post-cure, or both of these. It will also be recognized that even when a sequential operation is intended, some amount of ceramic formation may occur prior to a planned step of thermal treatment, as a result of the intrinsic kinetics and thermodynamics of the reaction system.

In some embodiments, a reactive thermal treatment is performed, in which the gas that is initially present is reactive toward the initial polymer, the final ceramic material, or both of these. When the gas is reactive, it may react with a component and cause it to leave the material. Alternatively, or additionally, the gas may react with a component and remain with the base material. It is also possible for the gas to react and form products, some of which depart from the material while the rest remains with the material. Reactive gases may be selected from $O_2$, $O_3$, air, CO, $CO_2$, $H_2$, $H_2O$, $CH_4$, $SO_2$, $H_2S$, $NH_3$, NO, $NO_2$, $N_2O$, $C_1$-$C_5$ hydrocarbons, and so on. In certain embodiments in which there is nitrogen content in the final ceramic material (e.g., $Si_3N_4$ or SiCN), $NH_3$ is included as a reactive gas, along with an inert gas (e.g., Ar) during thermal treatment. When it is desired to reduce oxygen content in the final ceramic material, thermal treatment may be carried out with hydrogen or hydrocarbons (e.g., methane, ethane, or propane), along with an inert gas (e.g., Ar). The maximum temperature for reactive thermal treatment may be, for example, about 300° C. to about 1500° C. The system pressure may also be adjusted to influence the gas atmosphere.

The pyrolysis or other thermal treatment process produces a three-dimensional photonic crystal which may include various ceramic materials such as, but not limited to, SiC, SiOC, $Si_3N_4$, SiON, SiCN, SiOCN, SiBN, SiBCN, BN, $TiO_2$, $ZrO_2$, ZnO, or a combination thereof. The composition of the ceramic 3D photonic crystal is directly dependent on the composition of the starting preceramic resin. When carbon is desired in the 3D photonic crystal, the fraction of carbon may be tailored, for example, by adding phenyl groups on the side chain of the polymer or by using a carbon-based crosslinking agent such as divinyl benzene.

During the thermal treatment, whether an inert or reactive thermal treatment technique is employed, gases escape. Gases are formed during the conversion of preceramic polymer to the ceramic structure, by decomposition reactions of the polymer and possibly other components present (e.g., photoinitiator, free-radical inhibitor, 3D-printing resolution agent, etc.). The escaping gases or vapors may include (but are by no means limited to) $CH_4$, $H_2$, CO, $CO_2$, $H_2O$, $SO_2$, $H_2S$, $CH_3S$, etc.

The overall mass loss associated with the conversion of preceramic polymer to the ceramic structure may vary widely, such as from about 1 wt % to about 90 wt %, e.g. about 5, 10, 20, 30, 40, 50, 60, 70, or 80 wt %. The overall mass loss will be dictated by the starting formulation (e.g., fraction organic versus inorganic) as well as by process parameters. In principle, the lost mass may be recovered separately and used for other purposes.

The preceramic polymer may shrink as it converts to the ceramic structure. (e.g., see FIGS. 8 and 9). The linear shrinkage (calculated in a single dimension, such as height) may be from 0% to about 60%, for example. Note that the mass loss and shrinkage are not necessarily correlated. In some embodiments with high mass loss, there is not much (if any) shrinkage. These embodiments tend to produce higher porosity and therefore lower densities. In some embodiments with high mass loss, there is substantial shrinkage, unless solid-phase fillers are included. These embodiments tend to produce lower porosity, or no porosity, and therefore higher densities (e.g., fully dense ceramic materials). Finally, in some embodiments, there is little mass loss but shrinkage associated with chemical reactions taking place. These embodiments also tend to produce relatively high densities.

Despite shrinkage, if any, the bulk shape (relative geometry) of the 3D-printed preceramic polymer may be preserved in the final ceramic structure. That is, when shrinkage is uniform in all dimensions, the geometrical features (lattice parameters) are retained in the part: it is a scaled-down version, in all three dimensions. In some embodiments, shrinkage is approximately uniform, which means the geometrical features are basically maintained, with slight deviations. This is the case with FIG. 9, discussed in the Example. Uniform shrinkage is possible when there is no random fragmentation during conversion of the preceramic polymer to the ceramic structure, and when the reactions and gas escape are isotropic within the material. Note that very small features, such as at the nanoscale, may not be preserved during otherwise uniform shrinkage.

Practically speaking, uniform shrinkage (or no shrinkage) enables the formation of parts that are "net shape" or "near net shape." "Net shape" means that the geometrical features are retained, so that manufactured 3D photonic crystals allow final fabrication matching the intended design with little or no post-processing. "Near net shape" means that the geometrical features are not perfectly retained but require only minimal post-processing or hand-work. Both net-shape parts and near-net-shape parts require little or no machining, polishing, bonding, surface finishing, or assembly.

In some embodiments, the starting preceramic resins are designed to allow the ceramic structures to be formed with high thermal stability (such as chemical and physical stability at temperatures greater than 1500° C.) and good mechanical strength (including stiffness, flexural strength, hardness, and/or fracture toughness).

The ceramic structure may be characterized by at least 50% theoretical density. By "theoretical density" it is meant the actual density of the ceramic structure as a percentage of theoretical density of the material itself, calculated in the absence of porous voids. For example a ceramic structure with absolute density of 2.0 g/cm$^3$, fabricated from a base material with inherent (bulk) density of 2.1 g/cm$^3$, exhibits a theoretical density of 2.0/2.1=95%. In various embodiments, the ceramic structure is characterized by a theoretical density of about (or at least about) 50%, 60%, 70%, 75%, 80%, 85%, 90%, or 95%. In certain embodiments, without limitation, the ceramic structure is a fully dense structure, which means that the ceramic structure has at least 99% (e.g., essentially 100%) theoretical density. The absolute density in g/cm$^3$ will vary, depending on the selection of base materials. In general (without limitation), absolute densities ranging from about 0.1 g/cm$^3$ to about 5 g/cm$^3$ may be produced. A fully dense ceramic may have a density from about 1 g/cm$^3$ to about 4 g/cm$^3$, for example.

The strength of the final ceramic material will vary, depending on the initial preceramic resin, as well as the processing parameters. In some embodiments, the final ceramic material is characterized by a Young's Modulus of at least about 200 GPa, 300 GPa, 400 GPa, 500 GPa, or more, measured at 25° C. In some embodiments, the final ceramic material is characterized by a flexural strength of at least about 300 GPa, 400 GPa, 500 GPa, or more, measured at 25° C. In some embodiments, the final ceramic material is characterized by a hardness of at least about 10 GPa, 20 GPa, 30 GPa, or more, measured at 25° C.

The engineering strength of a ceramic part also will depend on the lattice geometry. It is noted that, for instance, that a silicon oxycarbide microlattice fabricated with the present methods exhibits a higher strength than ceramic foams of similar density.

The thermal stability of the final ceramic material will vary, depending primarily on the initial preceramic resin. In various embodiments, the final ceramic material is thermally stable when exposed to a temperature of 1000° C., 1100° C., 1200° C., 1300° C., 1400° C., 1500° C., or 1600° C. for 24 hours under an air atmosphere at 1 bar pressure. Thermal stability means at least that the ceramic material does melt at these temperatures, and preferably also that the ceramic material does not react (e.g., by oxidation or reduction), undergo thermal shock, or physically decompose (introducing defects) at these temperatures.

EXAMPLES

Example 1: A UV-Curable Carbosilane Resin is 3D-Printed and Subsequently Pyrolyzed and Crystallized to SiC In this Example 1, a commercial carbosilane material is obtained and is functionalized to render it UV-curable, according to the specification. A flat disk of functionalized carbosilane resin is polymerized via UV curing, to generate a flat disk of polycarbosilane polymer.

The flat disk of polycarbosilane polymer is pyrolyzed in an argon atmosphere at 1000° C. for 1 hour. The polycarbosilane polymer is then crystallized in an argon atmosphere at 1400° C. for 4 hours, resulting in a polycrystalline SiC ceramic disk (this SiC material contains less than 10 wt % oxygen).

Figure 7:
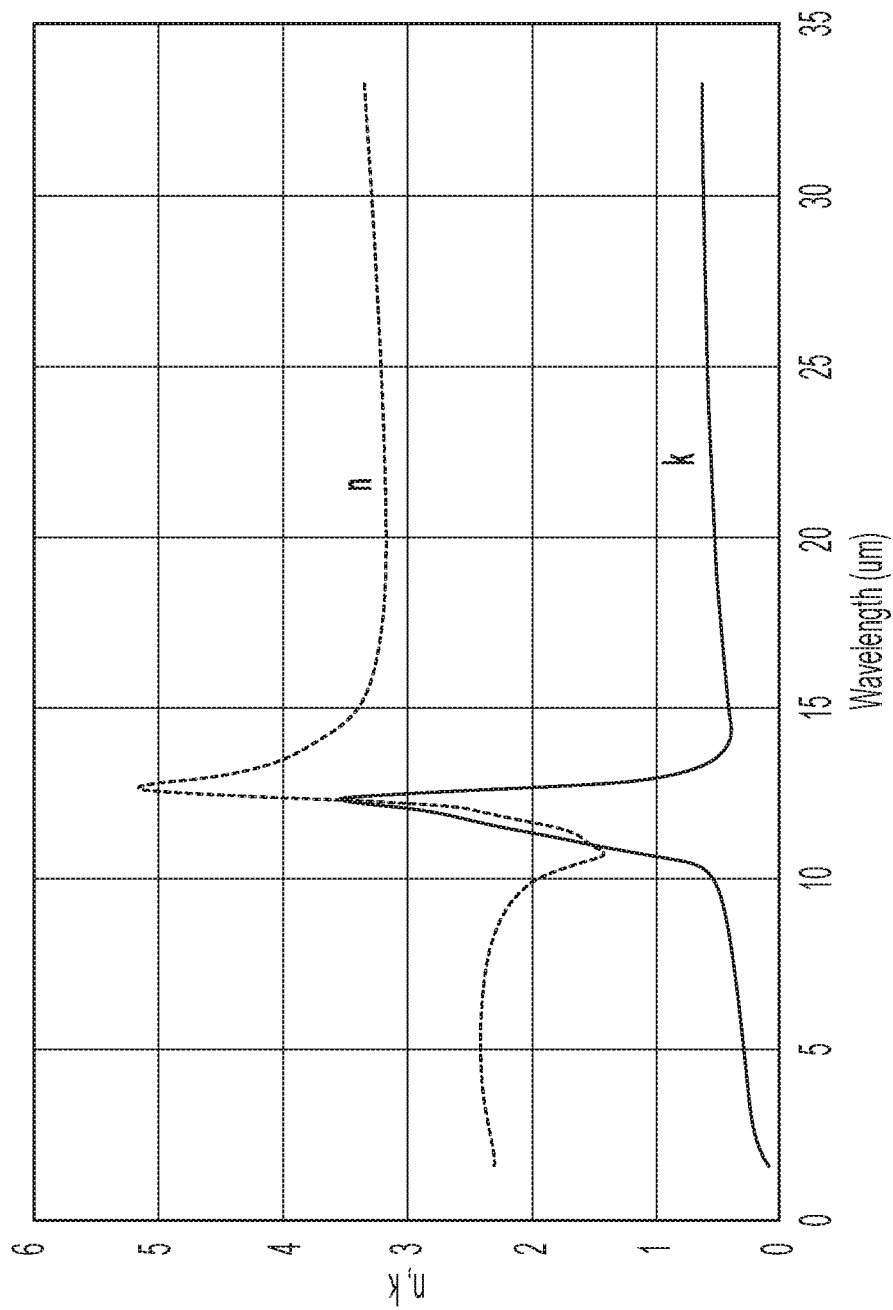
FIG. 7 shows fitted optical constants measured by ellipsometry for a 3D-printed carbosilane resin after heat treatment (n=dotted line, k=solid line), in the Example.

Reflectivity measurements are taken in a variable angle spectroscopic ellipsometer. FIG. 7 shows the fitted optical constants measured by ellipsometry. In FIG. 7, real (n) and imaginary (k) refractive indices are shown for the 3D-printed carbosilane resin after heat treatment (n=dotted line, k=solid line). The measured n and k refractive indices show a characteristic photon polariton resonance near 11 μm, as expected from SiC with low oxygen content. The real refractive index is greater than 2 in the MWIR region and greater than 3 at wavelengths longer than 14 μm, which indicate that this ceramic material is capable of a complete band gap when fabricated with a suitable lattice unit cell.

Figure 8:
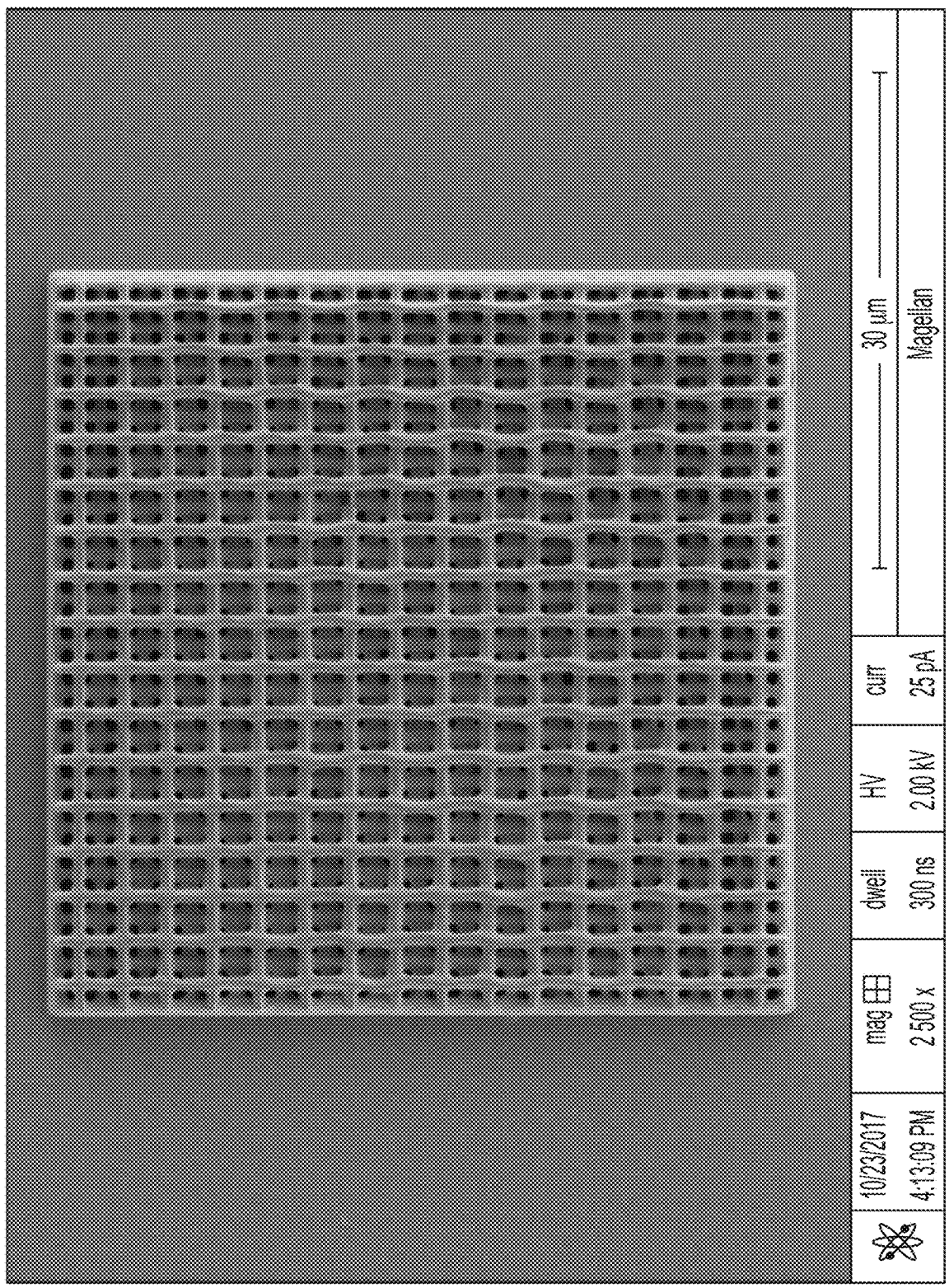
FIG. 8 is an SEM image (scale bar=30 µm) that shows a 3D-printed polycarbosilane logpile structure that is 4 unit cells thick, in the Example.

Example 2: A UV-Curable Carbosilane Resin is 3D-Printed and Subsequently Pyrolyzed and Crystallized to SiOC In this Example 2, a commercial carbosilane material is obtained and is functionalized to render it UV-curable, according to the specification. The starting functionalized carbosilane resin is 3D-printed into a logpile polycarbosilane polymer structure using a Nanoscribe® two-photon lithography tool (Nanoscribe GmbH, Karlsruhe, Germany). FIG. 8 is an SEM image (scale bar=30 μm) that shows the 3D-printed logpile structure that is 4 unit cells thick.

Figure 9:
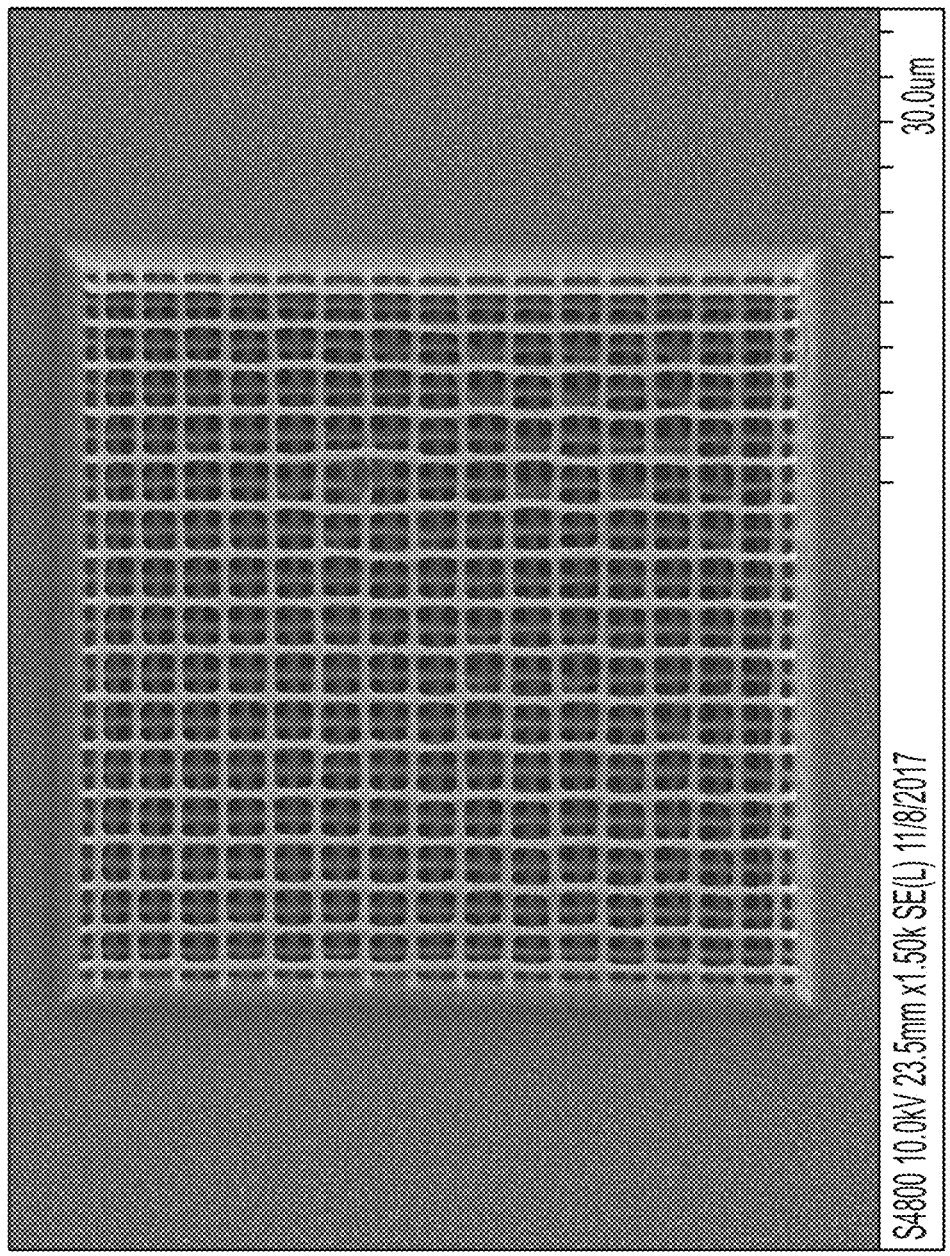
FIG. 9 is an SEM image (scale bar=30 µm) of a logpile SiOC ceramic material, in the Example.

The logpile polycarbosilane polymer structure is subsequently pyrolyzed at a temperature of 1000° C. for 1 hour, whereby the structure converts to a ceramic material and shrinks by approximately 30% in volume. FIG. 9 is an SEM image (scale bar=30 μm) of the logpile SiOC ceramic material (this SiOC material contains greater than 30 wt % oxygen). It is observed that there are multiple layers on top of each other, such as illustrated in FIG. 5A. In this logpile structure, there are four layers.

Figure 10:
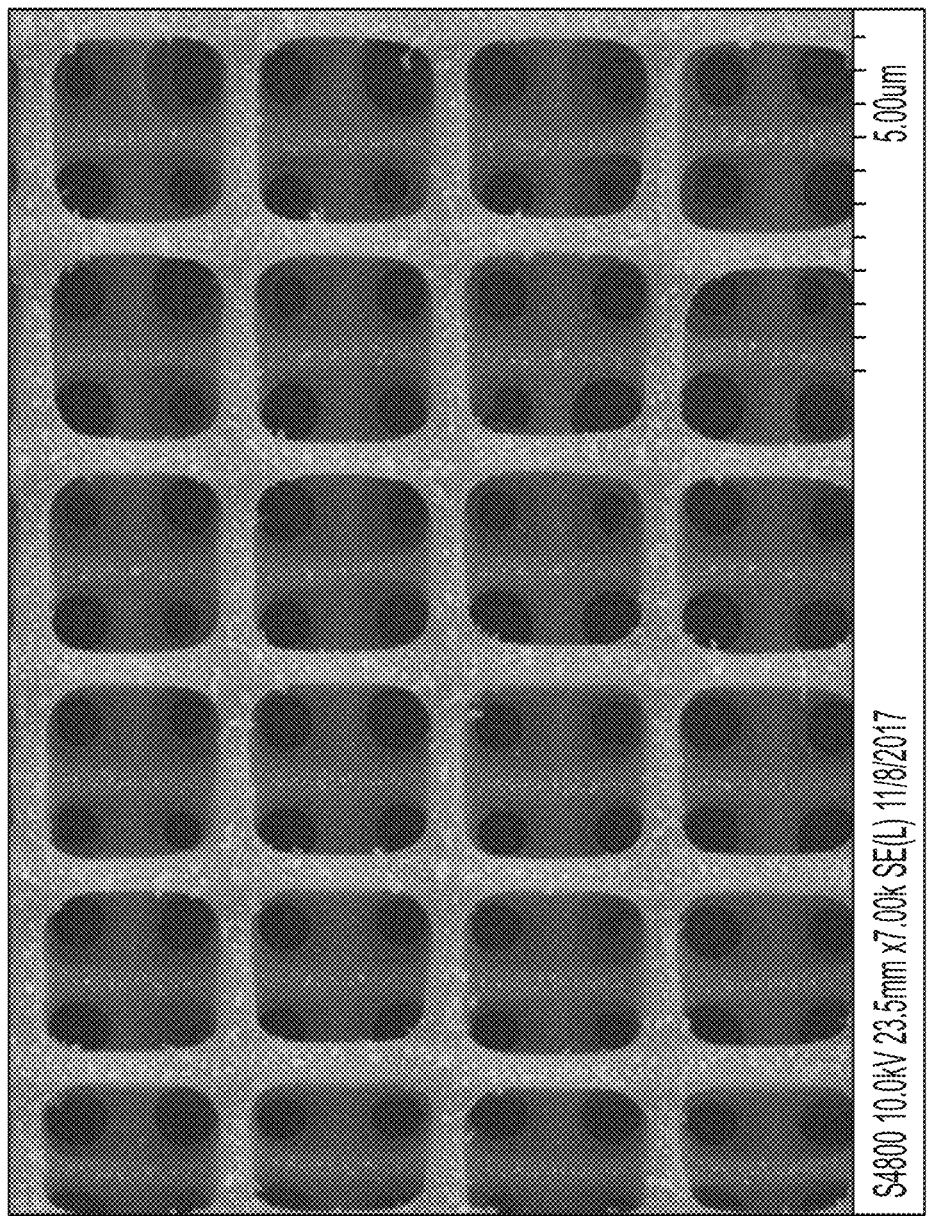
FIG. 10 is a high-magnification SEM image (scale bar=5 µm) of a SiOC logpile structure, showing a strut width of about 0.5 µm and strut-strut spacing of about 3 µm, along with structural nodes, in the Example.

FIG. 10 is a high-magnification SEM image (scale bar=5 μm) of the SiOC logpile structure showing a strut width of about 0.5 μm and strut-strut spacing of about 3 μm. Structural nodes are present with an effective diameter that is about 1-1.5 μm, which is at least twice the strut (rod) width. The structural node material is also SiOC derived from pyrolysis of the polycarbosilane.

In various embodiments, a structure disclosed herein may be utilized as an omnidirectional reflector with tunable wavelengths, a thermal emitter, or a semiconductor laser cooler. Additional applications of interest include, for example, thermal barrier coatings, thermophotovoltaics, propulsion structures (vanes, impellors, nacelles, and thrusters), control surfaces (fins and leading edges), hypersonic structures (thermal protection systems and heat shields), high-wear components (brakes, clutches, and rotors), catalyst support structures, pump components, filters, brakes, and clutches. Certain embodiments enable blackbody emission signature control. The thermal stability in extreme environments enables a tailored thermal emission spectrum for signature control. In various embodiments, an IR reflector provided herein can reflect peak blackbody radiation at a wavelength of 2-3 μm, for example, reflecting at least 10%, 20%, 30%, 40%, or 50% of the radiated power.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An omnidirectional infrared reflector comprising a three-dimensional photonic crystal containing:
   rods of a first material that has a first refractive index, wherein said rods are arranged to form a plurality of lattice periods that are periodic in all three dimensions, wherein said rods are connected at a plurality of nodes, wherein said lattice periods are characterized by a lattice spacing, and wherein said rods are characterized by a rod radius or width; and
   a second material that has a second refractive index that is lower than said first refractive index, wherein said rods are embedded in said second material,
   wherein said lattice spacing and said rod radius or width are selected to produce a photonic band gap within a selected band of the infrared spectrum.

2. The omnidirectional infrared reflector of claim 1, wherein said selected band of the infrared spectrum is from about 1 μm to about 15 μm wavelength.

3. The omnidirectional infrared reflector of claim 2, wherein said selected band of the infrared spectrum is from about 2 μm to about 3 μm wavelength.

4. The omnidirectional infrared reflector of claim 1, wherein said photonic band gap is a complete photonic band gap within said selected band of the infrared spectrum.

5. The omnidirectional infrared reflector of claim 1, wherein said lattice spacing is from about 0.5 μm to about 20 μm.

6. The omnidirectional infrared reflector of claim 5, wherein said lattice spacing is from about 1 μm to about 3 μm.

7. The omnidirectional infrared reflector of claim 1, wherein said rod radius or width is from about 50 nm to about 5 μm.

8. The omnidirectional infrared reflector of claim 1, wherein the ratio of said rod radius or width to said lattice spacing is from about 0.05 to about 0.50.

9. The omnidirectional infrared reflector of claim 1, wherein said plurality of lattice periods is at least 4 lattice periods that are periodic in all three dimensions.

10. The omnidirectional infrared reflector of claim 1, wherein said three-dimensional photonic crystal has a diamond unit cell.

11. The omnidirectional infrared reflector of claim 1, wherein said three-dimensional photonic crystal has a logpile unit cell.

12. The omnidirectional infrared reflector of claim 1, wherein said first refractive index is at least 2, and wherein said second refractive index is less than said first refractive index.

13. The omnidirectional infrared reflector of claim 1, wherein said first material is a ceramic material.

14. The omnidirectional infrared reflector of claim 13, wherein said ceramic material is selected from the group consisting of SiC, SiOC, $Si_3N_4$, SiCN, $TiO_2$, $ZrO_2$, ZnO, and combinations thereof.

15. The omnidirectional infrared reflector of claim 13, wherein said ceramic material is a pyrolyzed form of a preceramic resin, which is optionally a 3D-printed, preceramic resin.

16. The omnidirectional infrared reflector of claim 1, wherein said second material is selected from the group consisting of air, $MgF_2$, LiF, $CaF_2$, $BaF_2$, $SiO_2$, SiOC, and combinations thereof.

17. The omnidirectional infrared reflector of claim 1, wherein at least some of said nodes are structural nodes configured to mechanically reinforce said rods.

18. The omnidirectional infrared reflector of claim 17, wherein said structural nodes have a structural-node radius or width that is at least 10% larger than said rod radius or width.

19. The omnidirectional infrared reflector of claim 1, wherein said omnidirectional infrared reflector is thermally stable when exposed to a temperature of 1300° C. for 24 hours under an air atmosphere at 1 bar pressure.

20. The omnidirectional infrared reflector of claim 1, wherein said omnidirectional infrared reflector comprises multiple layers each having distinct three-dimensional photonic crystals.

* * * * *